United States Patent [19]

Ishimura et al.

[11] Patent Number: 5,081,483
[45] Date of Patent: Jan. 14, 1992

[54] CAMERA CONTROL SYSTEM

[75] Inventors: Toshihiko Ishimura, Habikino; Yasuaki Akada, Osaka; Reiji Seki, Sakai; Nobuyuki Taniguchi, Nishinomiya; Norio Ishikawa, Osaka, all of Japan

[73] Assignee: Minolta Camera Kabushiki Kaisha, Osaka, Japan

[21] Appl. No.: 623,546

[22] Filed: Dec. 7, 1990

Related U.S. Application Data

[60] Division of Ser. No. 484,480, Feb. 26, 1990, Pat. No. 4,982,221, which is a continuation of Ser. No. 361,710, May 31, 1989, abandoned, which is a continuation of Ser. No. 237,674, Aug. 24, 1988, abandoned, which is a continuation of Ser. No. 27,220, Mar. 17, 1987, abandoned.

[30] Foreign Application Priority Data

| Mar. 18, 1986 | [JP] | Japan | 61-61734 |
| Mar. 28, 1986 | [JP] | Japan | 61-72347 |
| Mar. 28, 1986 | [JP] | Japan | 61-72348 |
| Mar. 28, 1986 | [JP] | Japan | 61-72349 |
| Apr. 2, 1986 | [JP] | Japan | 61-76910 |
| Apr. 2, 1986 | [JP] | Japan | 61-76911 |
| Apr. 2, 1986 | [JP] | Japan | 61-76912 |

[51] Int. Cl.⁵ .................................. G03B 17/20
[52] U.S. Cl. ........................ 354/412; 354/468; 354/484; 354/289.12
[58] Field of Search ............. 354/275, 289.12, 474, 354/475, 412, 468, 484

[56] References Cited

U.S. PATENT DOCUMENTS

| 4,149,795 | 4/1979 | Sakurada | 354/289.12 |
| 4,483,601 | 11/1984 | Sekida et al. | 354/288 |
| 4,647,176 | 3/1987 | Shimizu et al. | 354/475 |
| 4,678,306 | 7/1987 | Kiuchi et al. | 354/217 |
| 4,692,008 | 9/1987 | Arakawa et al. | 354/289.12 |
| 4,855,781 | 8/1989 | Hoshino | 354/468 |

OTHER PUBLICATIONS

Minolta 7000 Camera Catalogue (Japanese Language Version) pp. 16–19 of English Language Version 7000 504E-C1.

Minolta 9000 Camera Catalogue (Japanese Language Version) pp. 18, 19, 22–25, 30 and 34 of English Language Version Max 9000 A4 507E-A1.

Primary Examiner—Michael L. Gellner
Attorney, Agent, or Firm—Burns, Doane, Swecker & Mathis

[57] ABSTRACT

A camera control system is provided having a plurality of microcomputers, each microcomputer operating in conjunction with a respective clock which generates clock pulses at a respective frequency. A first microcomputer controls a second microcomputer after the second microcomputer has stabilized after initial start up. The first microcomputer controls the overall camera operation, and the second microcomputer controls the camera display operation. When a battery is loaded into the camera, both microcomputers are reset.

5 Claims, 19 Drawing Sheets

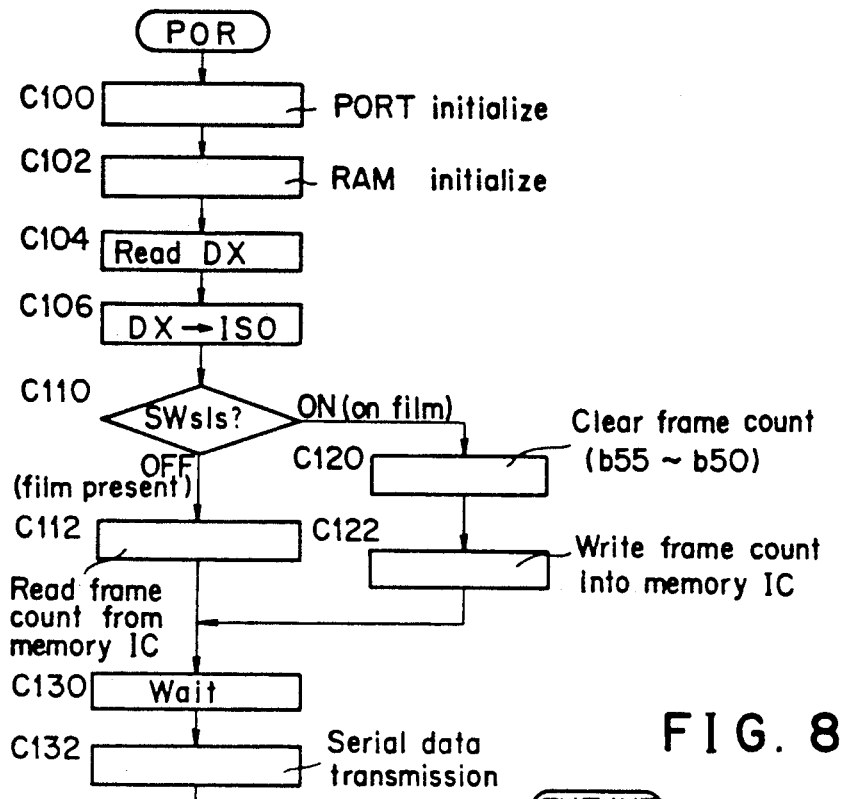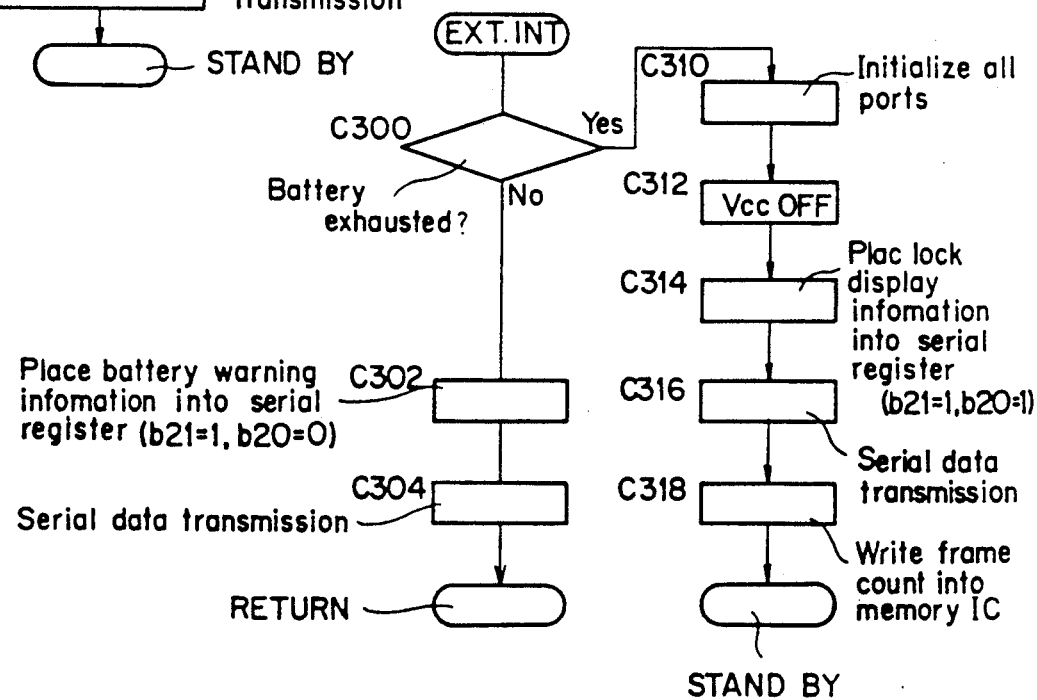

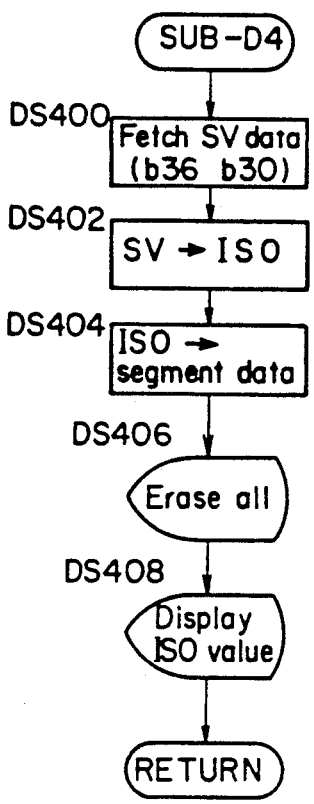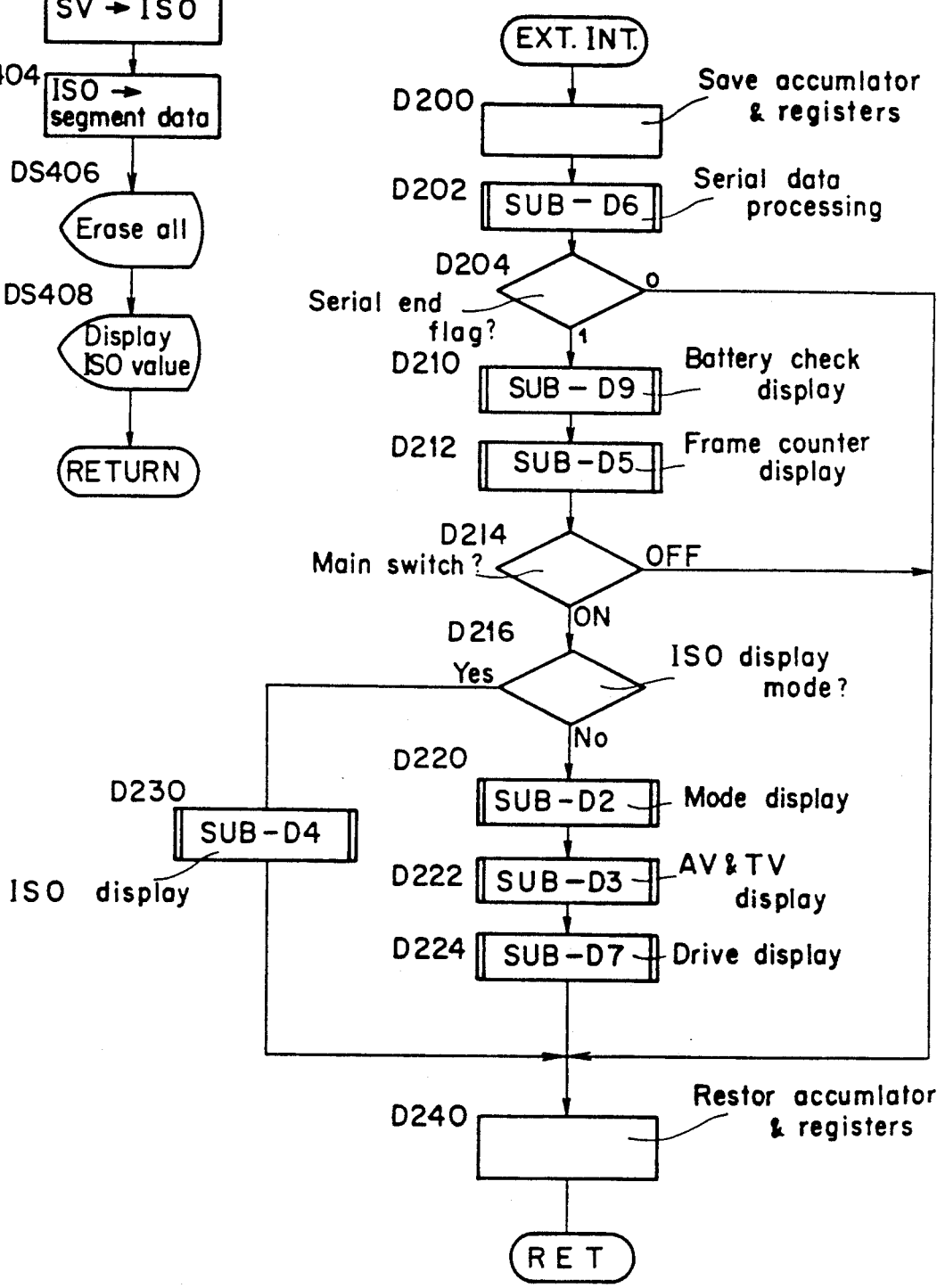

Film not loaded

During initial loading

Initial loading completed

During winding

Normal condition

Film end

Rewinding started

Film remaining 3/4

2/4

1/4

Rewinding completed

CAMERA CONTROL SYSTEM

This application is a divisional, of application Ser. No. 07/484,480 filed Feb. 26, 1990, now U.S. Pat. No. 4,982,221 which is a continuation of application Ser. No. 07/361,710 filed on May 31, 1989, now abandoned, which is a continuation of application Ser. No. 07/237,674 filed on Aug. 24, 1988 now abandoned, which is a continuation of application Ser. No. 07/027,220 filed on Mar. 17, 1987 now abandoned.

BACKGROUND OF THE INVENTION

1. Field of the Invention

This invention relates to a display system for a camera, and more particularly to a display system for displaying various kinds of information within a finder or on an outer face of a body of a camera. The present invention also relates to a camera having a plurality of microcomputers.

2. Description of the Prior Art

Conventionally, a camera is known wherein information of a set exposure time of a set diaphragm aperture value, information regarding an exposure control mode, information of a film sensitivity, information representative of a film feeding condition, information of a number of photographed frames of a film and some other information are displayed on a display device on an upper face of a camera body while information regarding an exposure control mode, set or calculated information of an exposure time and a diaphragm aperture value, information regarding a brightness of an object to be photographed and some other information are displayed on another display device within a finder.

In a camera of the type mentioned, it is a drawback that, since information regarding an exposure time or a diaphragm aperture value is commonly displayed on the display device on an outer face of the camera body and also on the display device within the finder, an area for display of such information is required for each of the display devices and consequently the size of each of the display devices must be large accordingly or else individual display elements of the display devices must be small accordingly, which may make it difficult to discern information displayed on the display devices.

SUMMARY OF THE INVENTION

It is an object of the present invention to provide a display system for a camera which can provide an efficient display of information with a reduced entire area for display.

Another object of the present invention is to provide a display system for a camera which is useful and convenient for a photographer to confirm photographing information necessary for the current photograph situation.

In order to attain the object, the present invention has been made perceiving that, in a camera, particularly in a camera of the type which has a programmed automatic exposure control mode wherein a diaphragm aperture value and a shutter speed are automatically determined in accordance with a predetermined program, it is sufficient, during photographing, for exposure control values such as a diaphragm aperture value and a shutter speed to be confirmed only within a finder of the camera and it is less necessary for such exposure control values to be displayed on an outer face of a camera body. Also in a metered manual exposure control mode of the camera wherein a diaphragm aperture value and a shutter speed are determined manually in accordance with a metered display of a measured brightness value in order to obtain a proper exposure, it is sufficient for such a metered display to be provided only within the finder and it is less necessary for the metered display to be provided on the outer face of the camera. In other words, since a photographer normally looks into the finder when an exposure onto a film is to be effected, it may be sufficient for the photographer only if exposure control values such as a diaphragm aperture value and a shutter speed can be confirmed within the finder.

Meanwhile, the present invention has been made also perceiving that a display of information regarding a film such as presence or absence of a film loaded in the camera, a sensitivity value of a film or a number of already photographed frames of a film is not necessary during photographing when a photographer looks into the finder for such photographing. In other words, normally such information regarding a film as mentioned above must only be confirmed when photographing is not being achieved, and accordingly a display of such information must only be provided at a location of the camera where it can be seen from outside the camera.

The display system for a camera is constructed to provide the camera with a display device located on an outer surface of the camera body and a display device located within a finder of the camera body. Both display devices are controlled to display various kinds of information for photographing such information regarding exposure control values is displayed only on the display device within the camera finder while information regarding a film is displayed only on the display device on the camera outer surface.

Accordingly, exposure control values such as an exposure time and a diaphragm aperture value to be controlled at the exposure is confirmed within the camera finder by a photographer watching the finder during photographing, and film information such as presence or absence of a film or a number of photographed frames of the film is confirmed from the camera outer surface during photographing not being achieved, thereby providing an convenient confirmation of the photographing information for the photographer.

It is an object of the present invention to provide a camera, having a plurality of microcomputers using different oscillation frequencies, which has reliable operation.

It is another object of the present invention to provide a camera, having a plurality of microcomputers, using different oscillation frequencies, where the communication linkage of the microcomputers is reliably established when data are transferred between the microcomputers.

It is a further object of the present invention to provide a camera having one microcomputer for the camera operation control and another microcomputer for the camera display control, where simultaneous starting of the oscillator circuits of the two respective microcomputers does not result in an improper display.

It is a still further object of the present invention to provide a camera wherein a power-on reset operation is performed in response to loading of a battery without resulting in an improper display upon such power-on resetting.

BRIEF DESCRIPTION OF THE DRAWINGS

FIGS. 6 to 12 are flow charts illustrating operation of a control circuit of the camera of FIG. 1;

FIGS. 14 to 26 are flow charts illustrating operation of a display circuit of the camera of FIG. 1;

DETAILED DESCRIPTION OF THE PREFERRED EMBODIMENT

Now, the present invention will be described in detail in connection with a preferred embodiment thereof shown in the accompanying drawings.

Figure 1:
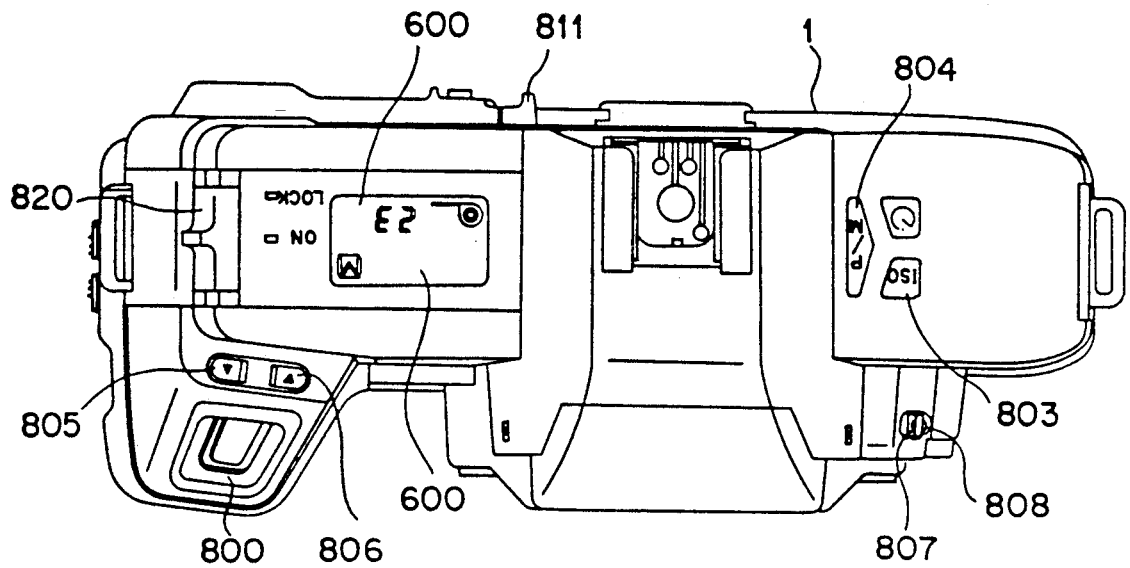
FIG. 1 is a top plan view showing a camera of an embodiment of the present invention.
Figure 2:
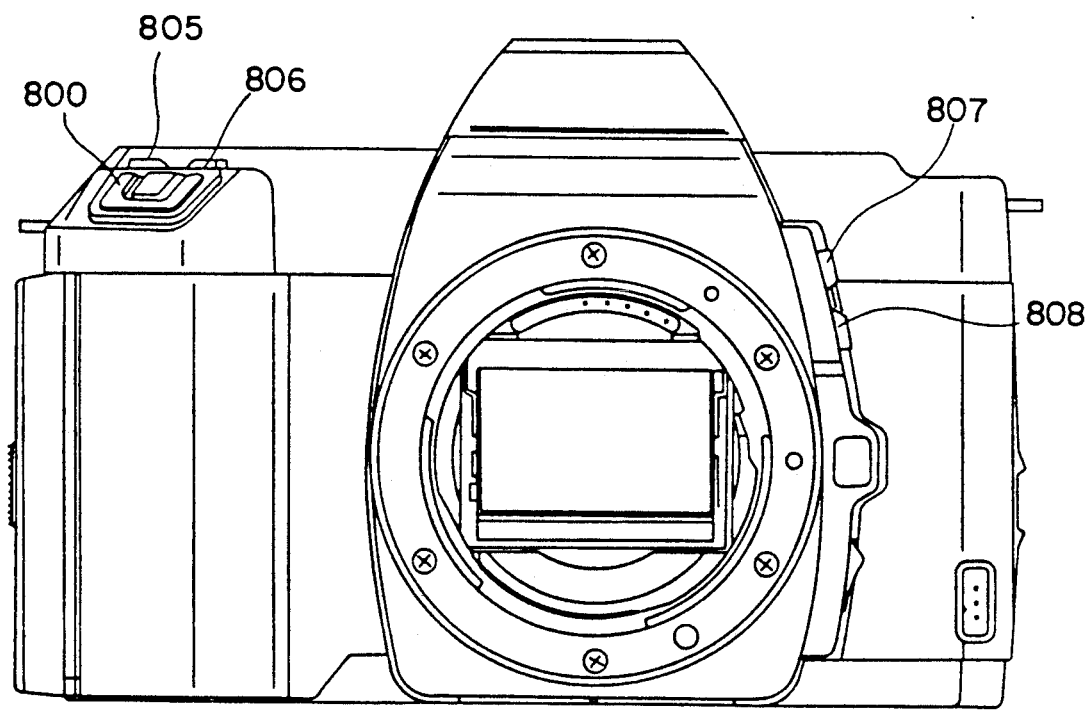
FIG. 2 is a front elevational view of the camera of FIG. 1.

Referring first to FIGS. 1 and 2, there is shown a camera to which the present invention is applied. The camera shown includes a display device 600 located on the top of a body 1 thereof for providing concentrated displays of various kinds of information such as an exposure control mode, a counted value of photographed frames of a film, a film sensitivity value, a warning of battery exhaustion and a state of a film feeding. The display device 600 may be constituted from a liquid crystal display panel.

A main switch 820 is mounted for sliding movement in a back and forth direction of the camera body 1 between a "LOCK" position in which operation of an entire electric circuit of the camera which will be hereinafter described is disabled and an "ON" position at which normal operation of the electric circuit is enabled. A shutter button 800 is mounted for depression from a normal inoperative position to a first position of a half stroke at which a photometry or a light measurement switch $SW_1$ shown in FIG. 3 is closed to start operation of a photometry or a light measurement circuit 210 shown in FIG. 3 and further to a second position of the full stroke at which a release switch $SW_2$ shown in FIG. 3 is closed to release a shutter mechanism of the camera.

An exposure control mode change-over key 804 is also mounted for depression, and each time the mode change-over key 804 is depressed, a programmed automatic exposure control mode (hereinafter referred to as a program mode) and a manual exposure control mode (hereinafter referred to as a manual mode) are alternately selected. An ISO key 803 is provided in order to cause a film sensitivity value (ISO value) set in the camera then to be recalled and displayed on the display device 600 while the ISO key 803 is kept depressed. An up key A 805, a down key A 806, another up key B 807 and another down key B 808 are provided in order to change some of the set exposure control values of the camera. For example, if the up key A 805 or the down key A 806 is depressed while the ISO key 803 is kept depressed, the ISO value displayed on the display device 600 will change in a designated direction, that is, in an increasing direction or in a decreasing direction, respectively. Consequently, the setting of the ISO value can be changed. On the other hand, if the up key A 805 or the down key A 806 is depressed when the camera is in the manual mode set as a result of operation of the mode key 804, the shutter speed value displayed on another display device 700 shown in FIG. 3 within a finder which will be hereinafter described in detail will change, and consequently a desired shutter speed value can be set to the camera. Similarly, if the up key B 807 or the down key B 808 is depressed when the camera is in the manual mode, the diaphragm aperture value displayed on the display device 700 within the finder will change, and consequently a desired aperture value can be set to the camera. A rewinding switch 811 is operated when a film is to be rewound.

Figure 3:
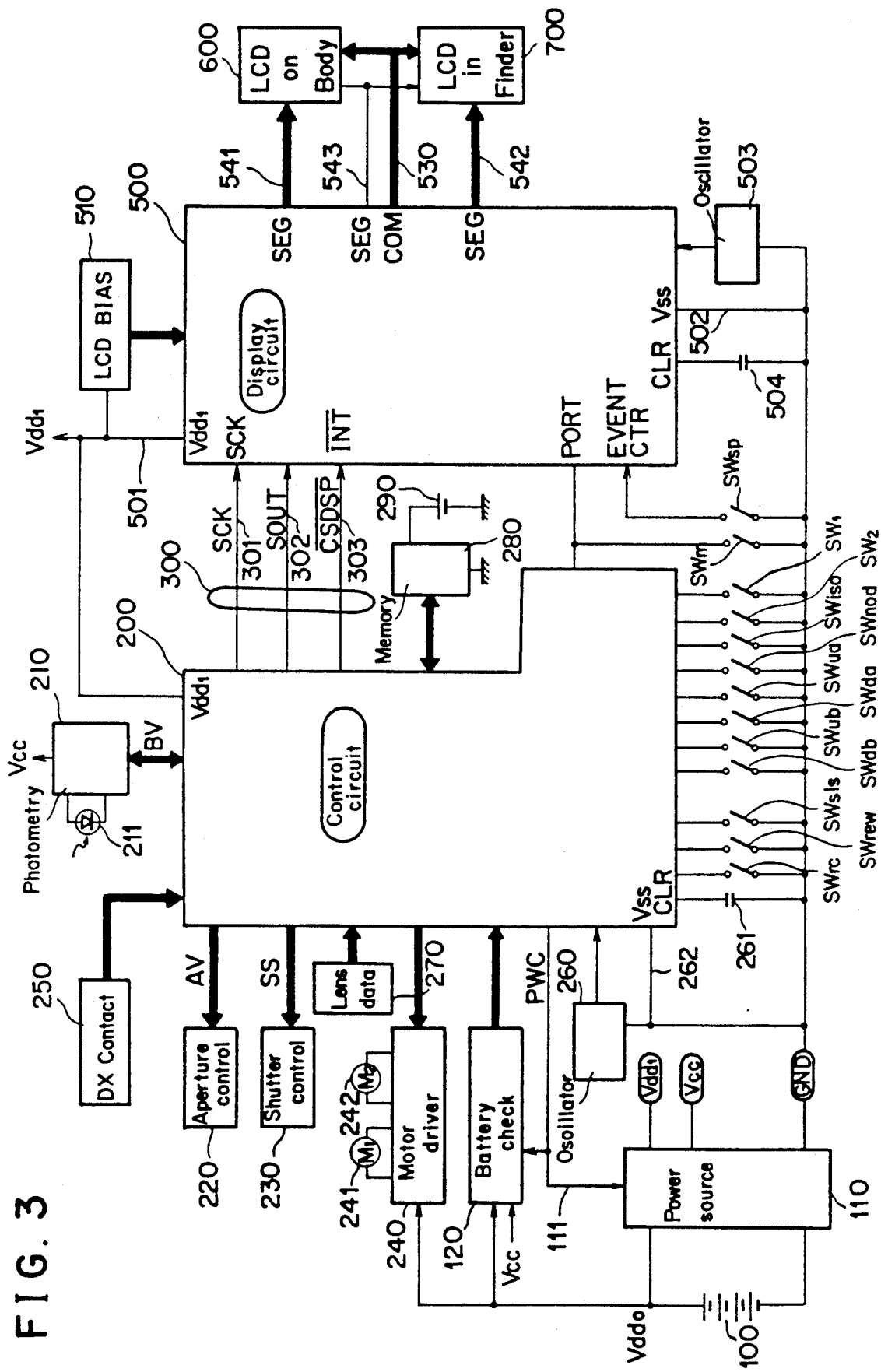
FIG. 3 is a circuit diagram showing an electric circuit of the camera of FIG. 1.

Referring now to FIG. 3 which illustrates construction of an electric circuit of the camera of FIG. 1, the electric circuit shown includes a main power source battery 100 for the entire camera, a power source circuit 10 connected to the main power source battery 100, and a battery checking circuit 120 for checking a voltage of the main power source battery 100. Here, the power source circuit 110 receives supply of electric power $Vdd_0$ from the main power source battery 100 and supplies electric power of a stabilized voltage Vcc and another stabilized voltage $Vdd_1$ to various circuits of the camera which will be hereinafter described. Of the output voltages Vcc and $Vdd_1$ of the power source circuit 110, the output of the voltage Vcc is controlled by a signal received at an input terminal 111 of the power source circuit 110 such that when the input signal at the input terminal 111 is at a "High" level, the output voltage Vcc is cut off or in other words is reduced to zero, and on the contrary when the input terminal 111 receives a "Low" level signal, the voltage Vcc is delivered from the power source circuit 110. Meanwhile, the output voltage $Vdd_1$ is delivered constantly. The battery checking circuit 120 always monitors the output voltage $Vdd_0$ of the main power source battery 100 and delivers a signal indicating a condition of the battery regarding a voltage level of the output voltage $Vdd_0$ of the battery.

A control circuit (hereinafter referred to as control CPU) 200 is provided to control sequencing operation of the entire camera, and all circuits described below thus operate under control of the control CPU 200. A light measuring or photometry circuit 210 includes a photometry element 211 for performing TTL photometry. The photometry circuit 210 receives a photoelectrically converted amount (corresponding to a brightness value of an object) measured by the photometry element 211 and converts it from an analog value to a digital value and then delivers the thus converted digital value as information relating to an object brightness Bv to the control CPU 200. An aperture control circuit 220 controls an aperture diaphragm (F-number) of photographing lens in accordance with an instruction from the control CPU 200. A shutter control circuit 230 controls timed movement of a leading screen and a trailing screen of a shutter in accordance with an instruction of shutter speed information from the control CPU 200.

A motor driving circuit 240 drives a motor $M_1$ 241 and another motor $M_2$ 242 in accordance with an instruction from the control CPU 200. Here, the motor $M_1$ is used for actuation upon shutter release to swing up a main mirror of the single-lens reflex camera and also for film winding-up operation, and forward rotation of the motor $M_1$ will cause shutter release operation, and reverse rotation of the motor $M_1$ will cause film winding-up operation. Meanwhile, the motor $M_2$ 242 is used only for film rewinding operation, and when the motor $M_2$ 242 is driven to rotate, the winding motor $M_1$ is automatically disconnected from a film feeding mechanism by a clutch or the like thereby to allow rewinding of the film. Here, since mechanisms which are driven by such a motor or motors to actually perform shutter release operation, film winding-up operation and film rewinding operation are already known and are not a principal subject of the present invention, detailed description will be omitted herein.

A contact 250 is provided for detecting a DX code indicated on an outer surface of a film magazine or cartridge and representing a sensitivity of a film, and the control CPU 200 thus reads a coded film sensitivity value (ISO value) on a surface of the magazine of the film by way of the contact 250. An oscillator circuit 260 supplies reference clocks to the control CPU 200. Here, since the control CPU 200 must necessarily control various operations of the camera with high accuracy in time, an oscillator circuit of a high frequency (for example, 4.19 MHz) is used for the oscillator circuit 260.

A capacitor 261 for resetting the control CPU 200 is connected to reset the control CPU 200 when the power source battery 100 is loaded in position into the camera. The control CPU 200 has a ground terminal 262 connected thereto. A lens data delivering circuit 270 is incorporated in a photographing lens mounted on the camera body 1 and delivers various data of the photographing lens including an open diaphragm aperture value, a maximum aperture value and a focal length.

An IC 280 is provided for storing data therein and is normally backed up by a back-up battery 290 which may be a lithium cell so that stored data in the memory IC 280 may not be erased by dropping of a voltage of the power source battery 100. The memory IC 280 is in the form of a RAM (Random Access Memory) into and from which a count number of frames of a film is written and read out by the control CPU 200 when necessary. Since in the present embodiment an internal memory of the control CPU 200 cannot hold the stored data when the main power source battery 100 becomes exhausted or is removed from the camera, data which must not be erased (for example, a frame count) are stored in the memory IC 280 which is backed up by the separate battery 290.

A display circuit 500 for driving the display devices 600, 700 of the camera is constituted from a 4-bit microcomputer, for example, with a liquid crystal driving circuit. The display device 600 which may be constituted from a liquid crystal display panel located on the top of the camera body 1 and the display device 700 which may also be constituted from a liquid crystal display panel located within the finder are both connected to the display circuit 500. A bias circuit 510 is provided to produce a bias voltage for driving liquid crystal display elements of the display devices 600, 700. Output of the bias circuit 510 is supplied to the display circuit 500 so that driving waveforms to be delivered to the display devices 600, 700 may be produced within the display circuit 500.

The switches $SW_1$, $SW_2$ operated by the shutter release button 800 of the camera are also connected to the control CPU 200, and when a photographer depresses the shutter release button 800 to the first position of its half stroke, the photometry switch $SW_1$ is turned on thereby to start photometry as described hereinbelow, and then when the shutter release button 800 is depressed to the second position of its full stroke, the release switch $SW_2$ is turned on thereby to effect releasing of the shutter. A switch SWiso is associated with the ISO key 803, and if the ISO key 803 is depressed to turn the switch SWiso on, an ISO value (film sensitivity value) set in the camera is recalled and displayed on the display device 600 on the camera body 1 only while the switch SWiso is kept on.

A mode switch SWmod is associated with the mode key 804. In the present embodiment, each time the mode key 804 is depressed, the exposure control mode of the camera is alternately changed over between the program mode and the manual mode. A switch SWua is associated with the up key A 805 and another switch SWda is associated with the down key A 806. In the present embodiment, if the up key A 805 is depressed while an ISO value is displayed on the display device 600 as a result of operation of the ISO key 803, the set ISO value can be changed in an increasing direction, and otherwise if the down key A 806 is depressed similarly, the set ISO value can be changed in a decreasing direction. Meanwhile, when the exposure control mode of the camera is the manual mode, the set shutter speed value can be increased or decreased by operation of the up key A 805 or the down key A 806, respectively. Further, a switch SWub is associated with the up key B 807 and another switch SWdb is associated with the down key B 808. These two keys are used to increase or decrease a set aperture value when the exposure control mode of the camera is the manual mode.

A film detecting switch SWsls is provided on a film winding spool shaft of the camera and presents a closed (on) condition when a film is not properly wound on a spool and an open (off) condition when a film is properly wound on the spool. A film rewinding switch SWrew is provided to automatically start, when it is turned on while a film is in the camera, rewinding of a film. A switch SWrc is associated with a rear cover of the camera and is turned on when the rear cover is closed and turned off when the rear cover is opened. Another switch SWsp is associated with a film rewinding shaft such that it may be turned on and off, for example, when the film rewinding shaft is rotated by one half rotation. Of the various switches mentioned above, the switches $SW_1$, $SW_2$, Swiso, SWmod, SWua, SWda, SWub, SWdb, SWrew and SWrc produce, when operated, a signal which can activate the control CPU 200. In other words, if a signal is delivered from any of the specifically listed switches to the control CPU 200 when the control CPU 200 is in its stand-by state, the control CPU 220 escapes from the stand-by state and enters a normal operative state in which it performs processing in response to the received signal. Detailed operations of the control CPU then will be described hereinbelow. A further switch SWm is associated with the main switch 820 of the camera, and when the switch SWm is in an open (off) condition, the camera is locked, but when the switch SWm is in a closed (on) condition, the camera will operate normally.

The display circuit 500 is constituted, in the present embodiment, from a 4-bit microcomputer as described hereinabove, and a serial data communication system using bus lines 300 is employed for communication of data between the control CPU 200 and the display circuit 500. Here, the bus lines 300 include a signal line 301 for transferring a serial clocks Sck, another signal line 302 for transferring a serial data Sout, and a further signal line 303 for transferring a display circuit selecting signal CSDSP.

When data is to be transferred from the control CPU 200 to the display circuit 500, the control CPU 200 changes the display circuit selecting signal CSDSP from an "H" level to an "L" level (here in the present embodiment, the CSDSP signal is effective when it is at the "Low" level) and then delivers a predetermined number of bits (number of bytes) of serial data Sout to the display circuit 500 in synchronism with the serial clocks Sck. Here, the signal line 303 for transferring a display circuit selecting signal CSDSP is connected to an external interrupt terminal INT of the display circuit 500. Accordingly, when the signal line 303 changes from the "H" to the "L" level, an interrupt occurs at the display circuit 500 so that the display circuit 500 prepares for reception of serial data transmitted from the control CPU 200. The display circuit 500 has a power source terminal 501 and a ground terminal 502 connected thereto.

A reference clock generating circuit 503 generates reference clocks for driving the display circuit 500. The oscillation frequency of the reference clock generating circuit 503 is of a level necessary and sufficient for processing of display data and for response in display (for example, 32.765 KHz) in order to save consumption of power. A capacitor 504 is connected to reset the display circuit 500 in response to the power supply $Vdd_1$ into the display circuit 500. The bias circuit 510 supplies a bias voltage for liquid crystal display to the display circuit 500 as described above. Four signal lines 530 transfer common signals for driving the display devices 600 and 700 while segment signal lines 541, 542, 543 are provided to transfer segment signals. Of the segment signal lines 541, 542, 543, the signal line 541 is wired only for the display device 600 and the signal line 542 is wired only for the other display device 700 while the signal line 543 is wired commonly for the display devices 600, 700 (description will proceed under an assumption that the crystal display panels are driven by a $\frac{1}{4}$-duty, $\frac{1}{3}$-bias method in the present embodiment).

Figure 4:
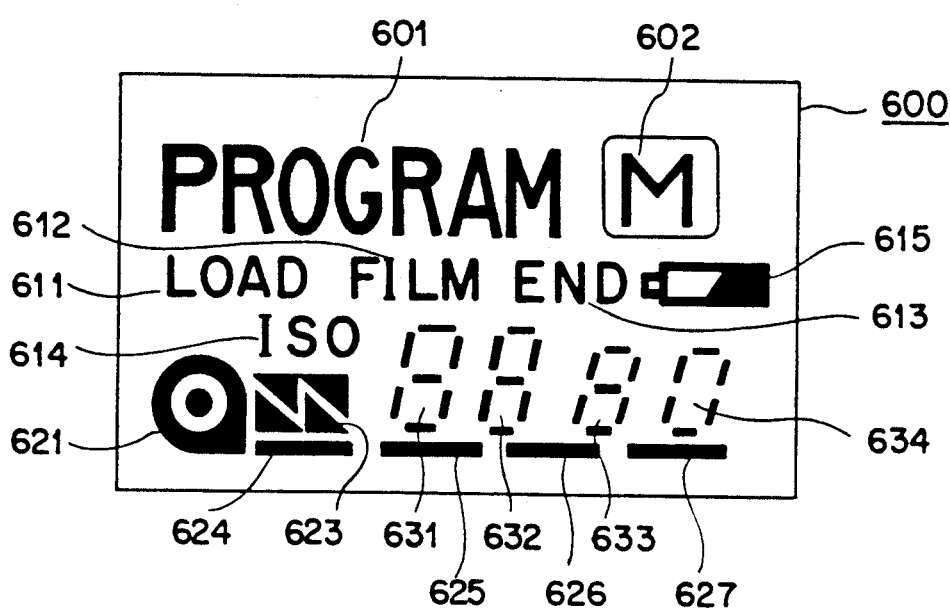
FIGS. 4 and 5 are illustrations of all the segments to be displayed by display devices provided on the top of a body and within a finder of the camera of FIG. 1, respectively.
Figure 5:
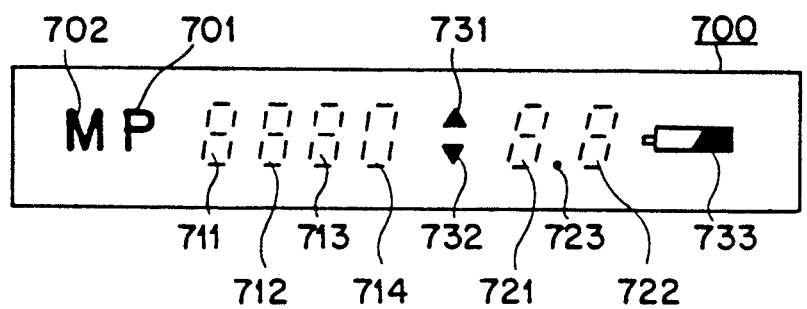

FIGS. 4 and 5 show exemplary display elements of the display devices of the camera, and FIG. 4 showing display elements of the display device 600 located at the top of the camera body, and FIG. 5 showing display elements of the display device 700 located within the finder.

Referring to FIG. 4, the display device 600 has display elements 601, 602 each in the form of a graphic pattern of a character or characters for displaying an exposure control mode of the camera, and when the camera is set to the program mode, the display element 601 is lit to display a word "PROGRAM", but when the camera is set otherwise to the manual mode, the display element 602 is lit to display a character "M". The display device 600 further has display elements or patterns 611, 612, 613 for instructing a photographer of operation necessary for loading of a film or for rewinding, and when a film is not yet loaded in the camera, the display elements 611 and 612 are lit at a same time to cooperatively display two consecutive words "LOAD FILM" requiring loading of a film into the camera. On the other hand, when available photographing number of a film loaded in the camera is completed, the display elements 612 and 613 are lit at a same time to cooperatively display two consecutive words "FILM END" representing completion of available photographing and thus requesting film rewinding operation. Meanwhile, in a normal photographing condition, only the display element 612 is lit for display and thus constitutes a frame counter together with frame counter displaying numeral elements 631 and 632 which will be hereinafter described.

The display device 600 further has a display element or pattern 615 which indicates a current condition of the main power source battery 100 of the camera, and when available power remains sufficiently in the power source battery 100, the display element 615 is in an extinguished state, but if the battery is consumed to enter a warning range, the display element 615 is caused to blink, for example, at 1 Hz. Numeral display elements or patterns 631, 632, 633 each include 7 segments while another display element or pattern 634 is provided to display a numeral "0" with a single electrode. Thus, the display elements 631, 632, 633 and 634 are provided to cooperatively display a number of four figures, and a plurality of kinds of displays can be provided by selectively using the display segments of the display elements 631, 632, 633, 634. In particular, at first the two upper consecutive figures of the display elements 631, 632 indicate a count of a frame counter together with the display element 612 of "FILM" described above. Secondly, a film sensitivity (ISO value) is displayed using the display element 614 of the "ISO" mark and all the four numeral display elements 631, 632, 633, 634. It is to be noted that it is also possible to display a time (in seconds) elapsed upon bulb exposure or a time (in seconds) elapsed or remained for self timer photographing using the numeral display patterns.

The display device 600 further has a display element 623 for displaying a film winding-up direction and another display element 622 for displaying a film rewinding direction. Upon winding-up of a film after releasing of the shutter, the display element 623 is lit to indicate that a winding-up operation is proceeding properly. On the other hand, when photographing of all available frames of the film loaded in the camera is completed and then a following winding-up operation of the film is disabled so that the film is stretched in taut condition, the film winding-up direction display element 623 and the display elements 612, 613 for display of "FILM END" described above are caused to simultaneously blink, for example, at 2 Hz, to indicated and end of the film. Meanwhile, during rewinding of a film, the rewinding direction display element 622 is caused to blink, for example, at 2 Hz, to indicate that rewinding is proceeding properly.

The display device 600 further has a magazine mark element or pattern 621, a film set mark element or pattern 624 and bar display elements or patterns 625, 626, 627 for displaying a remaining amount of a film to be rewound. Here, where a film is loaded properly in the camera, the magazine mark element 621 and the film set mark element 624 are both lit, but on the contrary when a film is not loaded properly in the camera, neither of the mark elements 621, 624 is lit.

Meanwhile, if the rewinding member 811 shown in FIG. 1 is operated in order to rewind a film, the bar display elements 625, 626, 627 for displaying a remaining amount of a film to be rewound are lit in addition to the magazine mark element 621 and the film set mark element 624 as an initial state of display of a rewinding condition. In this instance, the four bar display elements 624, 625, 626, 627 cooperatively graphically represent a whole length of the film to be rewound, and as the rewinding operation proceeds, the display elements 627, 626, 625 are extinguished one after another in an order as listed each time about one fourth of the whole length of the film is rewound, and finally at a point of time when rewinding of the whole film is completed, the motor is stopped and the bar display element 624 is extinguished, thereby terminating the rewinding operation. Accordingly, at a time when rewinding is completed, only the magazine mark element 621 remains lit. It is to be noted that although any display element or elements such as the mode display elements or the frame counter other than the rewinding display elements may be lit for display simultaneously with the latter during display of such a rewinding condition, it is desirably to extinguish all the display elements other than the rewinding bar graph display elements in order to provide displays by the rewinding bar graph display elements prominent. Further, while in the present embodiment the bar display elements are extinguished one after another each for about one fourth of the entire length of a film to be rewound, display of a remaining amount of a film to be rewound may be provided in any other manner if convenient.

Now, display elements or patterns of the display device 700 within the finder will be described with reference to FIG. 5. The display device 700 has display elements or patterns 701, 702 for displaying a current exposure control mode of the camera, and when the camera is in the program mode, the display element 701 is lit to display a character "P", and on the contrary when the camera is in the manual mode, the display pattern 702 is lit to display another character "M". The display device 700 further has numeral display elements 711, 712, 713, 714 which cooperatively represent a number of four figures to give an indication of a shutter speed. Further numeral display elements 721, 722 are provided to represent a number of two figures for displaying an aperture value together with a decimal point display pattern or element 723. Further, index elements or patterns 731, 732 are provided to display, when the exposure control mode of the camera is the manual mode, whether a photometry value is in proper, under or over relationship with respect to set shutter speed and set aperture values. A battery mark pattern 733 is provided to display a condition of the main power source battery 100 of the camera in a similar manner as the battery mark element 615 of FIG. 4, and when available power remains sufficiently in the power source battery 100, the battery mark element 733 is extinguished, but when the battery is consumed to enter a warning range, it is caused to blink, for example, at 1 Hz for display.

It is to be noted that, of the display patterns or elements described above, the display element 601 for displaying "PROGRAM" and the display element 701 for displaying "P", the display elements 602 and 702 for displaying "M", and the battery mark elements 615 and 733 are individually driven in a parallel relationship by same driving signals from the display circuit 500.

Here in the present embodiment, the period of blinking of the battery mark elements 615, 733 is set to 1 Hz while the period of blinking of the other display elements is set to 2 Hz. This is determined in consideration of warning display for battery exhaustion at a low temperature. In particular, since the responding speed of liquid crystal drops at a low temperature, as the temperature drops, it becomes more difficult to attain blinking display at a high response. Meanwhile, since the performance of a battery falls at a low temperature, the probability of being checked as battery exhaustion increases comparing with that at a normal temperature. Therefore, in the present embodiment, only the blinking period of the battery mark elements 615, 733 is made longer than the blinking period of any other display element in order to allow the blinking display of warning of battery exhaustion to be recognized clearly even at a low temperature.

Now, contents of serial data to be transmitted from the control CPU 200 to the display circuit 500 by way of the serial data bus lines 300 will be described. Table 1 shows an example of contents of such serial data.

TABLE 1

| Byte No. | Bit No. | Definition of Data | Contents of Coded Data | | RAM Address for Storage |
|---|---|---|---|---|---|
| 1st Byte | b17 | Av Value | $2^3$ | Integer | |
| | b16 | | $2^2$ | Portion | |
| | b15 | | $2^1$ | | |
| | b14 | | $2^0$ | Fraction | m |
| | b13 | | $2^{-1}$ | Portion | |
| | b12 | | $2^{-2}$ | | |
| | b11 | Metered | b11 | b12 00 01 10 11 | |
| | b10 | Manual Index | Index | (off) | |
| 2nd Byte | b27 | Tv Value | $2^3$ | Integer | |
| | b26 | | $2^2$ | Portion | |
| | b25 | | $2^1$ | | |
| | b24 | | $2^0$ | Fraction | m+1 |
| | b23 | | $2^{-1}$ | Portion | |
| | b22 | | $2^{-2}$ | | |
| | b21 | Battery Check | 1=BC | Warn. Ind. 0=Norm. | |
| | b20 | Information | 1=BC | Lock Ind. 0=Else | |
| 3rd Byte | b37 | ISO Ind. Com. | =ISO | Ind. 0=Else | |
| | b36 | | $2^4$ | | |
| | b35 | | $2^3$ | Integer | |
| | b34 | | $2^2$ | Portion | m+2 |
| | b33 | | $2^1$ | | |
| | b32 | | $2^0$ | | |
| | b31 | | $2^{-1}$ | Fraction | |
| | b30 | | $2^{-2}$ | Portion | |
| 4th Byte | b47 | Exp. Cont. Mode | 0=P mode 1=M mode | | |
| | b46 | | | | |

TABLE 1-continued

| Byte No. | Bit No. | Definition of Data | Contents of Coded Data | | RAM Address for Storage |
|---|---|---|---|---|---|
| | b45 | | | | |
| | b44 | | | | m+3 |
| | b43 | | | | |
| | b42 | | | | |
| | b41 | Driving | b41 b40 00 01 10 11 | | |
| | b40 | Condition | Cond. (Rest) W.R. End | | |
| 5th Byte | b47 | | | | |
| | b46 | | | | |
| | b45 | | $2^5$ | | |
| | b44 | | $2^4$ | | m+4 |
| | b43 | Frame Counter | $2^3$ | Binary | |
| | b42 | Value | $2^2$ | | |
| | b41 | | $2^1$ | | |
| | b40 | | $2^0$ | | |

Thus, each communication from the control CPU 200 to the display circuit 500 involves a series of serial data from the first to the fifth byte with specific means assigned to individual bits thereof as shown in Table 1. As seen from Table 1, the upper 6 bits b17 to b12 of the first byte of the serial data represent aperture value display information (Av value) and are composed of 4 bits b17 to b14 of an integer portion and 2 bits b13, b12 of a fraction portion in order for the camera to have a display resolution of a ¼ Av unit. The lower 2 bits b11, b10 of the first byte represent display data for the over and under index elements 731, 732 for the metered manual mode, and when b11="1", the display element 731 is lit, and when b10="1", the display element 732 is lit for display.

Meanwhile, the upper 6 bits b27 to b22 of the second byte represent shutter speed display information (Tv value) and are composed of 4 bits b27 to b24 of an integer portion and 2 bits b23, b22 of a fraction portion in order for the camera to have a display resolution of a ¼ Tv unit. The lower 2 bits b21, b20 of the first byte represent battery check information. The bit b21 is a battery exhaustion warning flag, and when b21="1", the battery mark elements 615, 733 are caused to blink for display thereby to urge a user of the camera to exchange the battery 100. The bit b20 is a flag representative of a result of judgment of an operation limit, and when b20="1", all the display elements are extinguished in order to indicate that operation of the camera cannot be guaranteed due to exhaustion of the battery.

The third byte represents film sensitivity information (Sv value). The uppermost bit b37 of the third byte represents an ISO value display command, and when b37="1", an ISO value is displayed in priority. The lower 7 bits b36 to b30 represent a film sensitivity (Sv value) and are composed of 5 bits b36 to b32 of an integer portion and 2 bits b31, b30 of a fraction portion in order for the camera to have a display resolution of a ¼ Sv unit.

The uppermost bit b47 of the fourth byte represents information regarding the exposure control mode of the camera, and when b47="0", the camera is in the program mode, and otherwise when b47="1", the camera is in the manual mode. The two lowermost bits b41, b40 represent information regarding a driving condition of the motor: when b41, b40="00", the motor is off and inoperative; when b41, b40="1", a film winding-up operation is being proceeded by the motor $M_1$; when b41, b40="11", it is represented that winding-up has not been completed within a predetermined time during a film winding operation by the motor $M_1$, that is, feeding of all the photographable frames of the film is completed; and when b41, b40="10", a film rewinding operation is being proceeded by the motor $M_2$.

The lower 6 bits of the fifth byte of the serial data represent a value of the frame counter in the form of a binary coded data.

Sequencing operation of the control CPU 200 is illustrated in flow charts of FIGS. 6 to 12. FIG. 6 is a flow chart of a power-on resetting routine of the control CPU 200 when the main power source battery 100 is loaded in position into the camera. Referring to FIG. 6, the control CPU 200 first initializes all input/output ports thereof at step C100, and then initializes, at step C102, all pertinent RAMs including, in addition to the ordinary RAM for storing data therein, a serial data register for serial communication, and flags and other registers. Then at step C104, a DX code on a film loaded in the camera is read in by way of the DX contact 250, and then at step C106, film sensitivity information in the form of a DX code is converted into an ISO value data and placed into the serial data register.

Subsequently at step C110, the film detecting switch SWsls is checked, and when it is off, that is, when a film is loaded properly in the camera, the program advances to step C112 at which a frame count stored in the memory IC 280 is read out and placed into the cells b55 to b50 of the serial data register. On the other hand, when it is determined at step C110 that the film detecting switch SWsls is on and hence a film is not loaded properly in the camera, the frame count b55 to b50 of the serial data register is cleared at step C120, and then at step C122, a frame count "0" is written into the memory IC 280. After execution of step C112 or step C122, the program advances to step C130 at which the control CPU 200 waits for a little time (for example, 500 msec.) and then to step C132 at which contents of the serial data register are transmitted to the display circuit 500 by way of the serial data bus 300, whereafter the control CPU 200 enters a stand-by state.

By the way, the frequency of reference clocks of the control CPU 200 for which high speed processing ability is required is high (for example, 4.19 MHz) while the frequency of clocks of the display circuit 500 for which such high speed processing ability is not required is low (for example, 32.768 KHz). Accordingly, even if the battery 100 is loaded into the camera so that a voltage $Vdd_1$ is supplied simultaneously to the two circuits 200, 500, timings at which programs are started by power-on resetting may vary between the two circuits 200, 500. In particular, after power-on resetting, normally oscillation of clocks is started and stabilized earlier at the control CPU 200, which can process at a higher speed, to start execution of its program, but at such a timing, the oscillator circuit 503 of the display circuit 500 may not yet oscillate in a stabilized condition and accordingly execution of the program of the display circuit 500 may not be started as yet. Or else, even if it is assumed that the two circuits 200, 500 start execution of the programs at the same time, completion of an initializing operation of the display circuit 500 by power-on resetting will normally occur considerably later than that of the control CPU 200 because the execution time per instruction varies between the two circuits 200, 500. Therefore, the control CPU 200 in the present embodiment has a waiting time at step C130 of the power-on resetting routine so that transmission of serial data may be achieved only after the display circuit 500 has completed its preparation for subsequent reception of serial data after completion of its initialization in order to assure proper display to be provided on the display devices upon loading of the battery.

The control CPU 200 will start its operation from the stand-by state when it receives an interrupt input of a starting signal from outside. In the present embodiment, such a starting signal may be derived from any of the photometry switch $SW_1$, and the release switch $SW_2$ both associated with the shutter release button 800, the switch SWiso associated with the ISO key 803, the switch SWmod associated with the mode key 804, the switches SWua, SWda, SWub and SWdb associated with the up and down keys A, B 805, 806, 807 and 808, respectively, the switch SWrew associated with the rewinding switch 811, the switch SWrc operated by opening and closing of the rear cover, and the switch SWm associated with the main switch 820.

Figure 7:
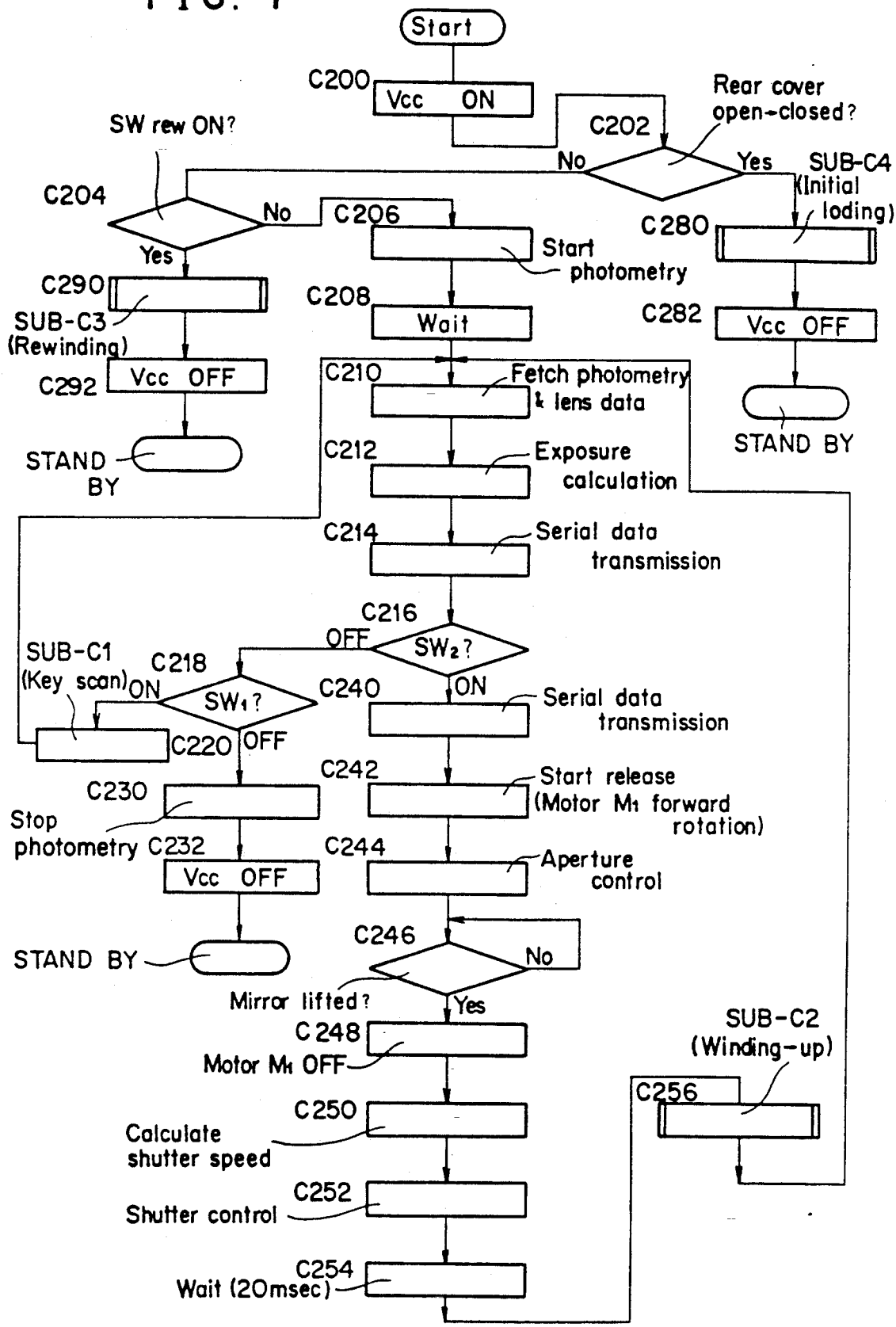
Figure 12:
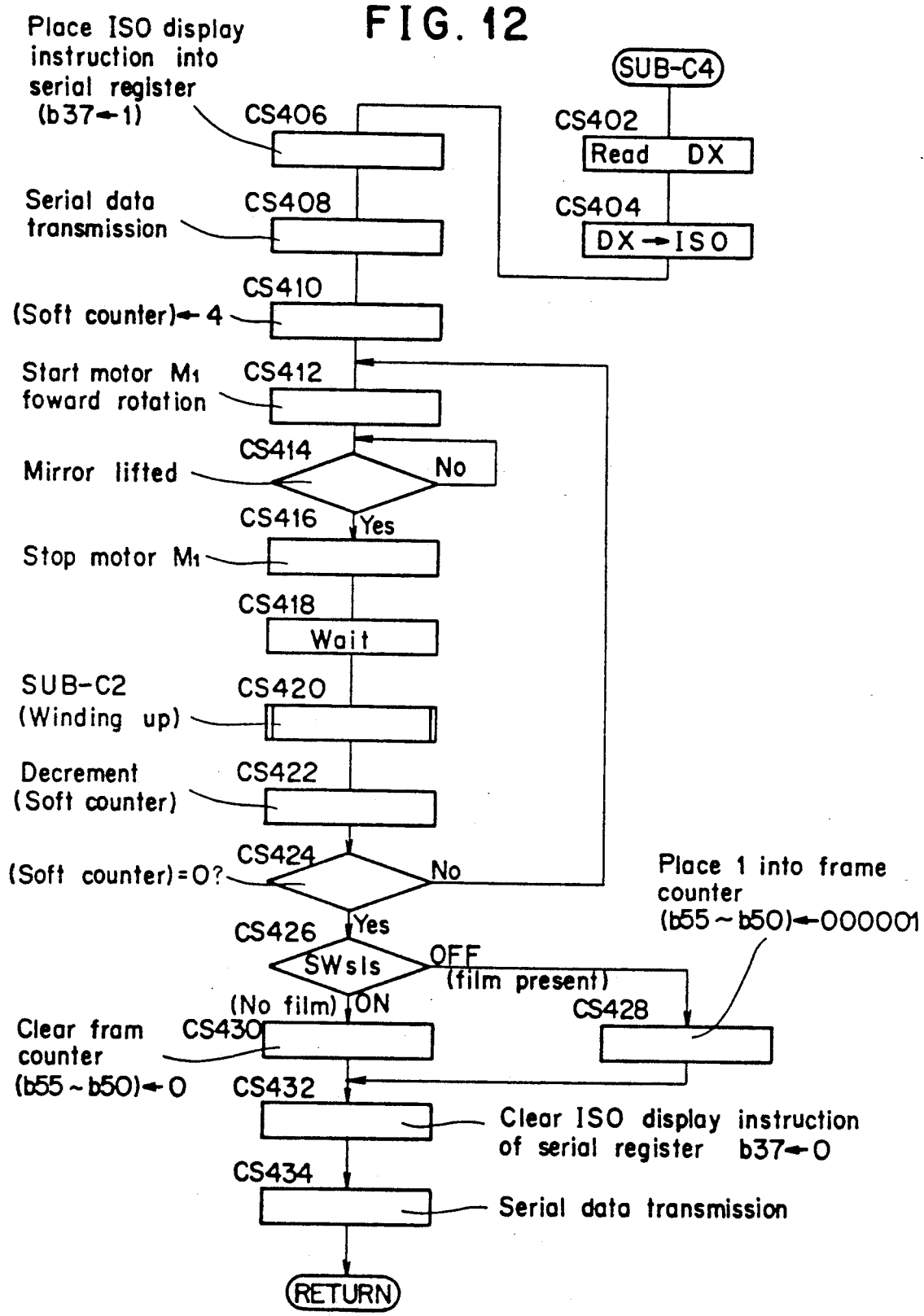

FIG. 7 is a flow chart illustrating operation of the control CPU 200 when it is started from its stand-by state by a starting signal. Referring to FIG. 7, at first at step C200, the input terminal 111 of the power source circuit 110 is changed to a "low" level to cause the power source circuit 110 to supply the predetermined power source voltage Vcc and simultaneously render the battery checking circuit 120 operative. Subsequently at step C202, the control CPU 200 reads information of the rear cover switch SWrc and checks whether or not the interrupt routine has been entered by closing of the rear cover. In case the interrupt has occurred by closing of the rear cover, the program jumps to step 280 at which a subroutine "SUB-C4" which will be hereinafter described in detail in FIG. 12 is executed to effect processing of initial loading of a film. In the initial loading processing, a film is automatically fed by a distance corresponding to four frames. Then, after completion of the initial loading processing at step C280, the power source voltage Vcc is reduced to 0 at step C282, and then the control CPU 200 enters its stand-by state again.

Meanwhile, when it is determined at step C202 that the interrupt routine has not been entered by closing of the rear cover, the program advances to step C204 at which it is determined whether or not the interrupt routine has been entered by operation of the rewinding switch SWrew. Here, if the interrupt has not occurred by operation of the rewinding switch SWrew, the program advances to step C206 at which the photometry circuit 210 is activated to start light measurement and analog-to-digital conversion of the measured photometry value and then to step C208 at which the control CPU 200 waits until the photometry circuit 210 is stabilized. After then, at step 210, such photometry value data is fetched from the photometry circuit 210 and lens data are also fetched from the lens data circuit 270. Then at step C212, the control CPU 200 executes calculations for exposure in accordance with the data thus fetches and writes an aperture value (Av value) and a shutter speed value(Tv value) thus calculated into the serial data register, and then at step C214, the Av and Tv values are transmitted to the display circuit 500.

Subsequently at step C216, the control CPU 200 checks whether or not the release switch $SW_2$ is on, and when it is not on, the program advances to step C218, but otherwise when it is on, the program jumps to step C240. Here, when the release switch $SW_2$ is not on at step #216, the control CPU 200 checks at step C218 whether or not the photometry switch $SW_1$ is on, and when the photometry switch $SW_1$ is on, the program advances to step C220 at which all the operating switches and keys of the camera are scanned in a key scan subroutine "SUB-C1". Thus, when such key scan finds out that one of the switches and keys is operated, required processing for the operated switch or key is executed. After then, the program returns to step C210. Details of the key scan subroutine "SUB-C1" at step C220 will be hereinafter described with reference to FIG. 9.

It can be seen from FIG. 7 that the control CPU 200 proceeds along a loop at steps C210~C216, C218 and C220 (hereinafter referred to as photometry loop) while the photometry switch $SW_1$ is kept on. However, if it is determined at step C218 that the photometry switch $SW_1$ is turned off, the program advances to step C230 at which the photometry operation is stopped and then to step C232 at which the power source voltage Vcc is reduced to zero, whereafter the control CPU 200 enters its stand-by state.

On the other hand, if it is detected at step C216 in the photometry loop that the release switch $SW_2$ is turned on, the program escapes from the photometry loop to step C240 at which all the serial data stored in the serial data register then are delivered again as final exposure control data to the display circuit 500. Then at step C242, the motor $M_1$ 241 is driven to rotate forwardly to start shutter releasing operation. Thus, as the motor $M_1$ 241 is rotated forwardly and upward swinging movement of a main mirror not shown is started, a control operation is executed at step C244 for controlling a diaphragm to an opening corresponding to the aperture value (Av value) obtained by the exposure calculation of the step C212. Subsequently, at step C246, the control CPU 200 checks a state of a switch not shown for detecting completion of upward swinging movement of the main mirror and thus waits until completion of the upward movement of the main mirror is detected while proceeding along a loop of the single step C246. Then, upon completion of the upward movement of the main mirror, the program advances to step 248 at which rotation of the motor $M_1$ 241 is stopped and then to step C250 at which an actual shutter speed controlling time is calculated from the shutter speed value (Tv value) obtained at the exposure calculation of the step C212, whereafter the leading and trailing screens of the focal plain shutter are controlled at step C252 in accordance with the calculated actual shutter speed controlling time to control operation of the shutter. Subsequently at step C254, the control CPU 200 waits for a little time (for example, 20 msec.) and then at step C256 executes processing for a film winding-up operation by a subroutine "SUB-C2". Details of operations in the subroutine "SUB-C2" will be hereinafter described in FIG. 10. After completion of the film winding-up operation at step C256, the program jumps again to step C210 in order to re-enter the photometry loop.

On the other hand, when it is determined at step C204 that the interrupt routine has been entered by operation of the rewinding switch SWrew, the program jumps to step C290 at which a film rewinding control operation is executed by a rewinding subroutine "SUB-C3" and then advances to step C292 at which the power source voltage Vcc is reduced to zero, whereafter the control CPU 200 enters its stand-by state. Details of the rewinding subroutine "SUB-C3" of the step C290 will be hereinafter described in FIG. 11.

FIG. 8 is a flow chart showing the battery checking routine. The battery checking circuit 120 has two decision levels with which the output voltage $Vdd_0$ of the main power source battery 100 is compared in order to produce a battery check signal to be delivered to the control CPU 200. A higher one of the decision levels is a battery exhaustion warning decision level while the other lower decision level is used to determine whether or not it is necessary to lock operation of the camera. Thus, when the output voltage $Vdd_0$ of the battery 100 crosses either of the decision levels, a pulse signal is delivered from the battery checking circuit 120 to an external interrupt terminal of the control CPU 200. In a simultaneous relationship with delivery of such a pulse signal, a result of the decision then is parallelly transmitted to the control CPU 200.

Referring to FIG. 8, when an external interrupt occurs at the control CPU 200 by a pulse signal from the battery checking circuit 120, it is determined at first at step C300 whether or not the main power source battery 100 is exhausted extremely, and if it is determined that operation of the camera should be locked, then the program jumps to step C310 at which all the ports of the control CPU 200 are initialized to stop operation of the camera and then advances to step C312 at which the power source voltage Vcc is reduced to zero. Subsequently at step C314, locking display information (b21="1", b20="1") is placed into the serial data register, and then at step C316, the serial data of the serial data register are transmitted to the display circuit 500. Then at step C318, the frame count b55 to b50 of the serial data register then are written into the memory IC 280, whereafter the control CPU 200 enters its stand-by state.

To the contrary, when it is determined at step C300 that the battery 100 is exhausted but not to such a degree that operation of the camera should be locked, the program advances to step C302 at which battery exhaustion warning display information (b21="1", b20="0") is placed into the serial register and then to step C304 at which the serial data of the serial data register then are transmitted to the display circuit 500, whereafter the program returns to the original routine from which the battery checking routine was entered. Since information of the main power source battery 100 is processed in the external interrupt routine in this manner, such information is immediately transmitted to and accepted by the display circuit 500 whichever other processing is being executed by the control CPU 200. Besides, since the frame count is written into the memory IC 280 at step C318 when a locked state of the camera is to be subsequently entered due to exhaustion of the battery, the frame count will not be lost even if the main power source battery 100 is replaced.

It is to be noted that in order to cope with such a possible situation that a user may replace the exhausted battery by a new one immediately after a warning of battery exhaustion has been given, the frame count then may be written into the memory IC just before a warning routine is entered. Otherwise, however, a new frame count may be written into the memory IC 280 each time the frame count is incremented.

Figure 9:
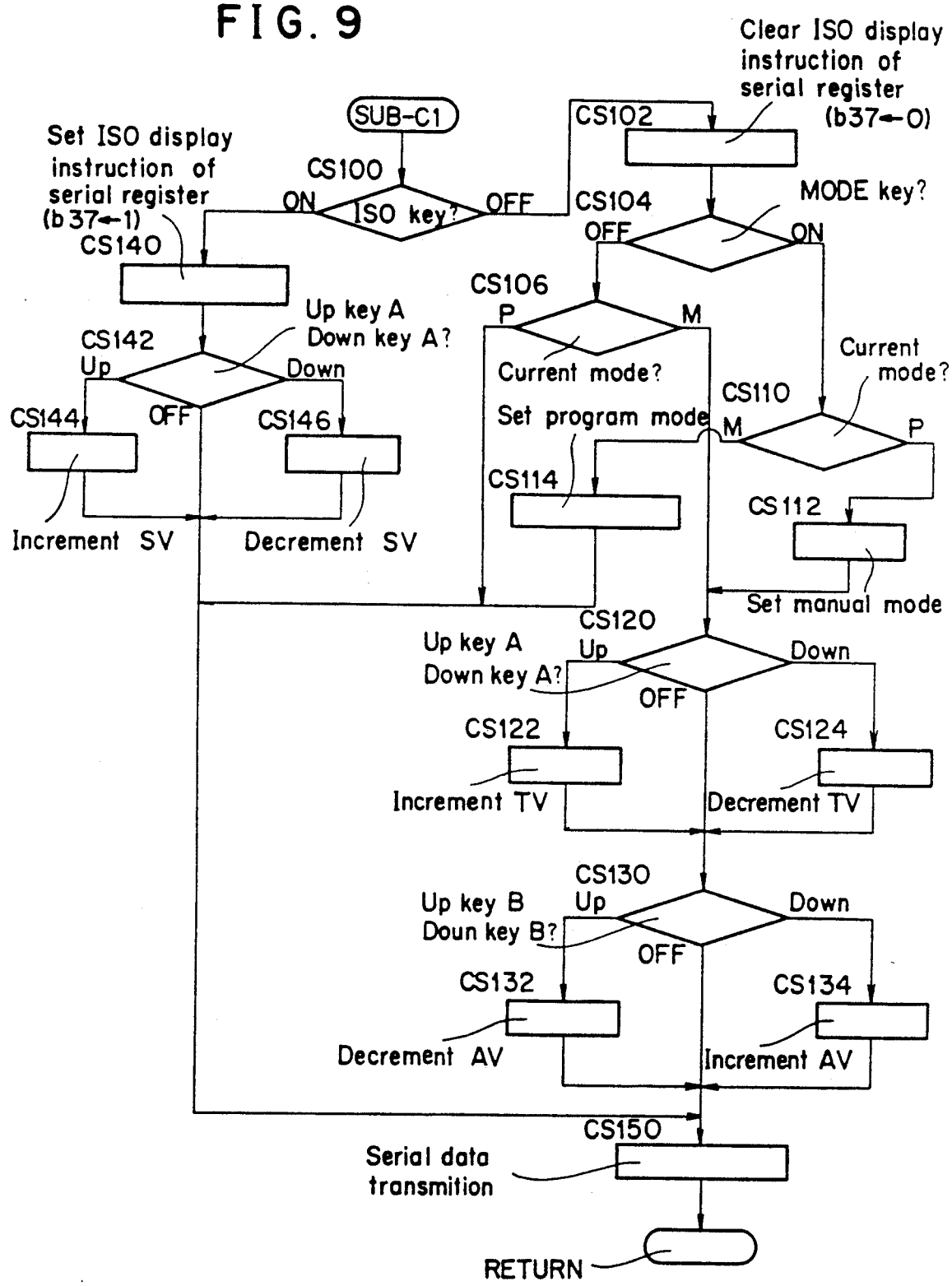

FIG. 9 is a flow chart illustrating details of the key scan subroutine "SUB-C1" of the control CPU 200 at step C220 of FIG. 7. Referring to FIG. 9, the control CPU 200 checks at first at step CS100 a state of the switch SWiso associated with the ISO key 803, and if the ISO key 803 is not depressed, the program advances to step CS102 at which the ISO display instruction b37 of the serial data register is cleared and then to step CS104 at which a state of the switch SWmod associated with the mode key 804 is checked. Thus when the mode key 804 is depressed and hence the exposure control mode is to be changed, the program advances to step CS110 at which the control CPU checks the currently set exposure control mode, and when the current mode is the program mode, the program advances to step CS112 at which the exposure control mode is re-set to the manual mode and then jumps to step CS120. To the contrary, when the current exposure control mode is the manual mode at step CS110, the exposure control mode is re-set to the program mode at step CS114 and then the program jumps to step CS150.

Meanwhile, when the mode key 804 is not depressed at step CS104, the currently set mode is checked at step CS106, and when the current exposure control mode is the program mode, the program advances to step CS150, but on the contrary when the current exposure control mode is the manual mode, the program advances to step CS120. Accordingly, in case the finally set mode is the program mode, the program advances to step CS150, but on the contrary in case the finally set mode is the manual mode the program advances to step CS120 in order to thereafter determine a shutter speed and an aperture value.

At step CS120, the control CPU 200 checks states of the switches SWua and SWda associated with the up and down keys A 805, 806, respectively, and if one of the keys 805, 806 is depressed, the current shutter speed value (Tv value) is incremented or decremented at step CS122 or step CS124, respectively, to determine a desired shutter speed value. Subsequently, the program advances to step CS130 at which states of the switches SWub, SWdb associated respectively with the up and down keys B 807, 808 are checked similarly, and when one of the keys 807, 808 is depressed, the current aperture value (Av value) is incremented or decremented at step CS132 or step CS134, respectively, to determine a desired aperture value, whereafter the program advances to step CS150.

In the meantime, when it is determined at step CS100 that the ISO key 803 is depressed, the program jumps to step CS140 at which the ISO display instruction b37 of the serial data register is set to "1" and then to step CS142 at which states of the switches SWua, SWda associated with the up and down keys A 805, 806 are checked. Thus, when one of the switches SWua, SWda is depressed, the current film sensitivity value (Sv value) is incremented or decremented at step CS144 or step CS146, respectively, to obtain a desired film sensitivity value, and then the program jumps to step CS150.

At step CS150, contents of the serial data register are transmitted to the display circuit 500, and then the program returns to the original routine which may be the routine of FIG. 7 and from which the key scanning subroutine was entered.

As apparent from the description above, just after the contents of the serial data register have been updated by the latest information obtained by scanning in the subroutine "SUB-C1", the step CS150 is executed to transmit the serial data from the control CPU 200 to the display circuit 500.

Figure 10:
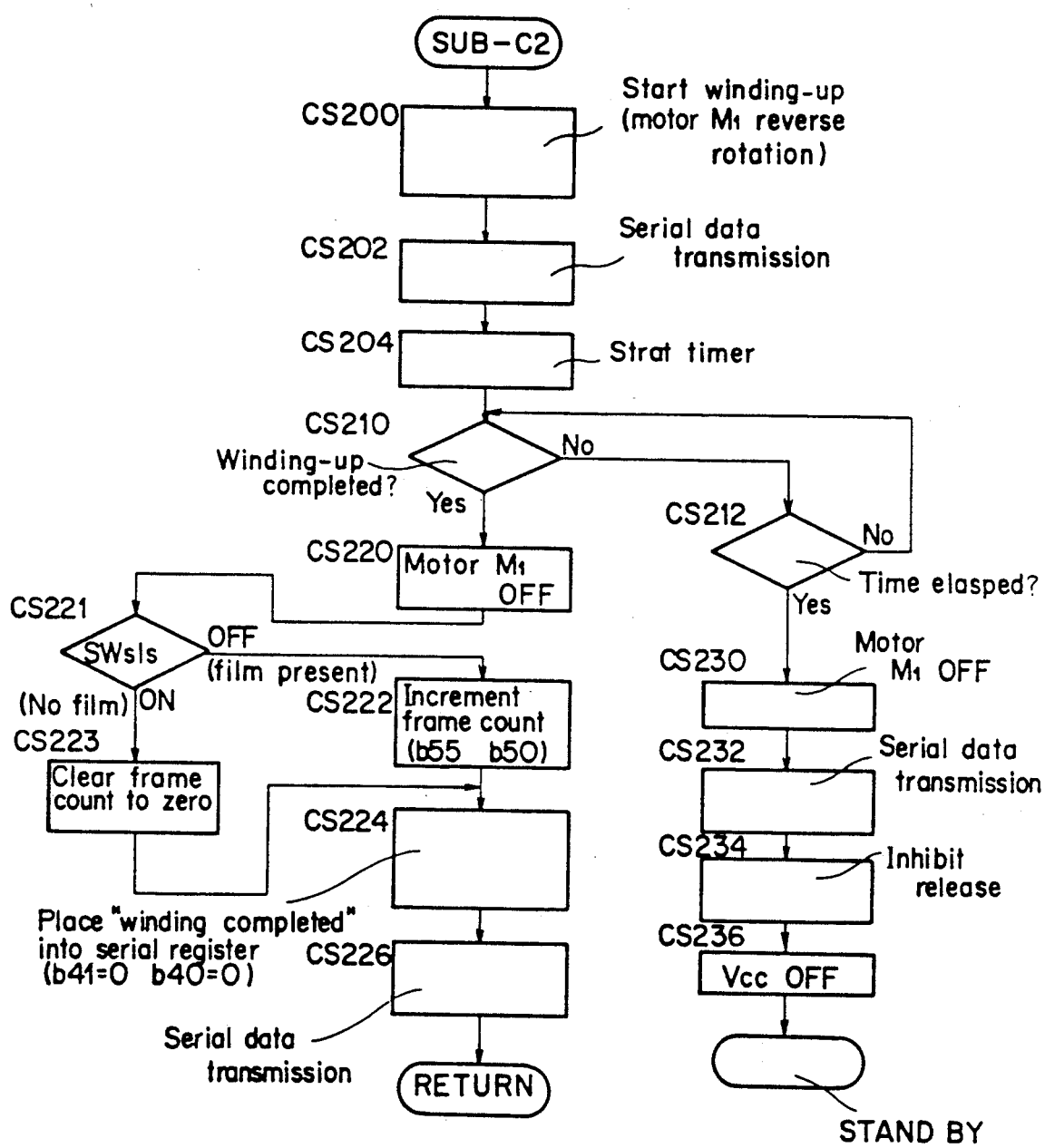

FIG. 10 is a flow chart of the subroutine "SUB-C2" illustrating details of a film winding-up operation of the control CPU 200 which is shown at step C256 of FIG. 7. Referring to FIG. 10, at first at step CS200, the motor $M_1$ is controlled to rotate in a direction reverse to the direction of rotation for shutter releasing operation in order to start winding-up of a film, then at step CS202, the serial data register is set to a winding-up state (b41="0", b40="1") and the serial data are transmitted to the display circuit 500. Subsequently at step CS204, a built-in timer incorporated in the control CPU 200 is set to a fixed time sufficient for one frame of a film to be completely wound-up (for example, 1.5 seconds) and is started, and then at step CS210, the control CPU 200 checks a state of a switch not shown for detecting completion of winding-up of a film.

Here, if completion of winding-up of the film is not detected at step CS210, contents of the timer which was precedingly started at step CS204 are checked at step CS212, and the preset time has not yet elapsed, the program returns to step CS210. Accordingly, until completion of winding-up of the film is detected and before the preset time elapses, the program circulates along a loop of the steps CS210 and CS212.

Then, if winding-up of the film is completed, this is detected at step CS210, and consequently the program escapes from the loop and advances now to step CS220 at which rotation of the motor $M_1$ 241 is stopped. Then, at step CS221, a state of the film detecting switch SWsls is checked to determine whether or not the film has been wound properly, and in case the film has been wound properly, the program advances to step CS222 at which the frame count b55 to b50 of the serial data register is incremented. To the contrary, in case it is determined at step CS221 that the film has not been wound properly (for example, when no film is contained in the camera or when a film has been loaded in failure into the camera), the program branches to step CS223 at which the frame count b55 to b50 of the serial data register is cleared to zero and then joins to step CS224. At step CS224, information representing completion of winding-up of a film (b41="0", b40="0") is placed into the serial data register, and then at step CS226, the serial data of the serial data register are transmitted to the display circuit 500, whereafter the program returns to the original routine.

On the other hand, when the preset time has elapsed at step CS212 before completion of winding-up of a film is detected at step CS210, that is, when winding-up of the film is not completed within the fixed preset time, the program escapes from step CS212 of the loop to step CS230. This corresponds to a condition wherein the film is stretched in taut condition during winding-up for the last frame thereof after completion of photographing of all the photographable frames of the film. In this instance, rotation of the motor $M_1$ 241 is stopped at step CS230, and then at step CS232, information representing the taut condition of the film (b41="1", b40="0") is placed into the serial data register, whereafter the serial data of the serial data register are transmitted to the display circuit 500. Then at step CS234, shutter releasing operation is inhibited, and then at step 236, the power source voltage Vcc is reduced to zero, whereafter the control CPU 200 enters its stand-by state.

Figure 11:
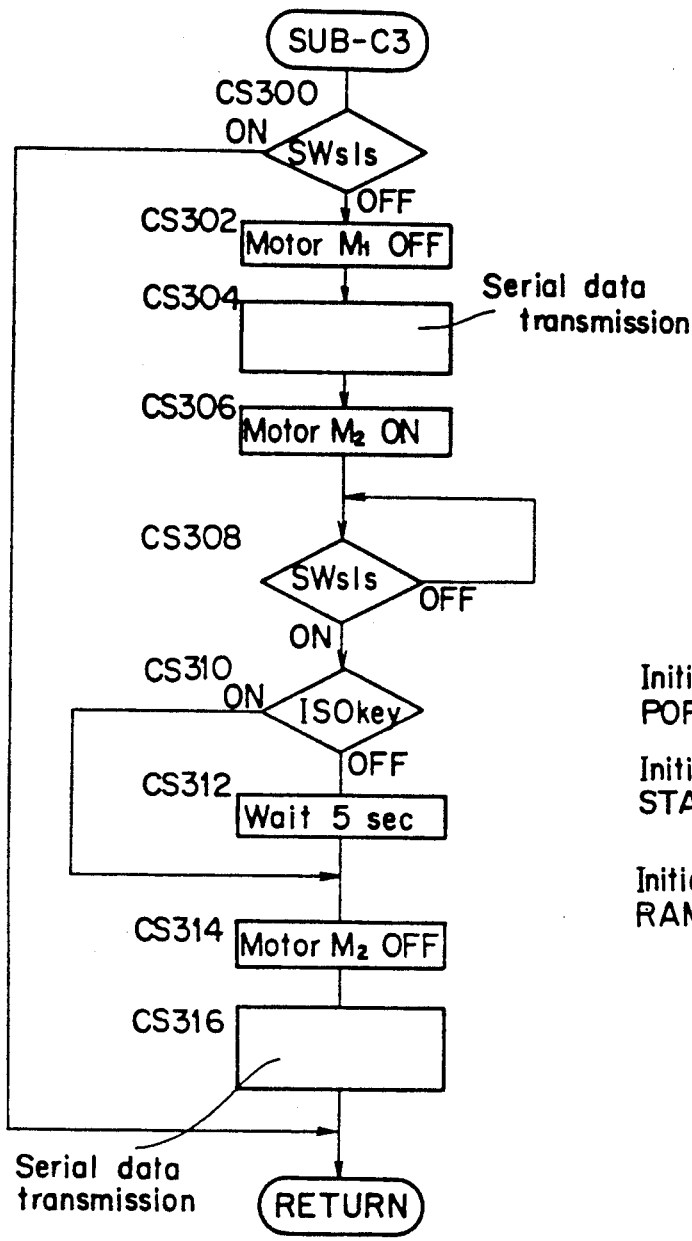

FIG. 11 is a flow chart illustrating detailed operation in the rewinding controlling subroutine "SUB-C3" of the step C290 of FIG. 7. When the rewinding member 811 shown in FIG. 1 is operated to turn on the switch SWrew shown in FIG. 3, the control CPU 200 is interrupted thereby and thus executes the subroutine "SUB-C3" of FIG. 11. At first at step CS300, a state of the film detecting switch SWsls is checked, and when the switch SWsls is on (that is, when no film is loaded in the camera), the program directly returns to the original routine because there is no necessity of executing a film rewinding operation. On the contrary, when the switch SWsls is off (that is, where a film is contained in the camera), the program advances to step CS302 in order to start a rewinding operation.

In the rewinding operation, in order to prevent the motor $M_1$ 241 and the motor $M_2$ 242 from being energized at a same time, rotation of the $M_1$ is first stopped at step CS302, and then the serial data register is set to a rewinding state (b41="1", b40="0") and the updated serial data of the serial data register are transmitted to the display circuit 500 in order to inform the display circuit 500 that a rewinding operation has been started, whereafter the rewinding motor $M_2$ is energized at step CS306 to start actual rewinding of the film. While the rewinding operation is proceeding, a state of the film detecting switch SWsls is checked at step CS308, and so far as the switch SWsls is off, the program repetitively proceeds along a loop of the step CS308.

Then, when the film is finally removed from the spool shaft of the camera, the film detecting switch SWsls is now turned on, and accordingly the program advances to step CS310 at which a state of the switch SWiso associated with the ISO key 803 is checked. If the ISO key 803 is not operated and hence the switch SWiso is off, the control CPU waits at step CS312 for a time sufficient for a leader portion of the film to be completely taken up into the film magazine (for example, 5 seconds) and then controls, at step CS314, the rewinding motor $M_2$ to stop its rotation. To the contrary, in case the ISO key 803 is depressed and consequently the switch SWiso is on at step CS310, the program advances directly to step CS314 in order to stop rotation of the motor $M_2$ without waiting the predetermined time at step CS312.

Then, after stopping of rotation of the motor $M_2$ at step CS314, the serial data register is partially rewritten (b41="0", b40="0") and the serial data of the serial data register are transmitted to the display circuit 500 at step CS316 in order to inform the display circuit 500 that the rewinding operation has been completed, whereafter the program returns to the original routine.

Here, the branch at step CS310 at which a state of the ISO key 803 is checked is provided in order to allow a photographer to alternatively determine, upon completion of rewinding of a film, whether a leader portion of the film is to be completely taken up into a film magazine or to be left unrewound. In particular, in case it is intended to leave a film leader portion unrewound outside a film magazine, the ISO key 803 may be depressed when rewinding of the film is started (that is, when the film detecting switch SWsls is changed from off to on).

On the contrary in case it is intended to rewind a film leader portion completely into a film magazine, rewinding of the film may be performed without depressing the ISO key 803. Here, while in the present embodiment the ISO key 803 is used in order to instruct the control CPU 200 whether or not an operation for rewinding a leader portion of a film completely into a film magazine, such an instructing means is not limited to the ISO key 803, and any other member which is not normally operated in a rewinding operation such as, for example, the mode key 804, may be used for the instructing means. Further, while in the present embodiment the ISO key 803 is depressed when it is intended to leave a film leader portion unrewound, it may be depressed on the contrary when it is intended to rewind an entire film leader portion into a film magazine.

FIG. 12 is a flow chart illustrating operation of the control CPU 200 in the subroutine "SUB-C4" for automatic control upon loading of a film (initial loading) shown at step C280 of FIG. 7. Referring to FIG. 12, at first at step CS402, a DX code of a film placed in the camera is read in by way of the DX contact 250, and then at step CS404, the DX code thus read is converted into an ISO value and is stored into the serial data register b36 to b30. Then at step CS406, the ISO display instruction bit of the serial data register is set (b37="1"), and then the serial data of the serial data register are transmitted to the display circuit 500 at step CS408. Consequently, the display circuit 500 continues to have the ISO value compulsorily displayed during initial loading operation as will be hereinafter described.

Subsequently at step CS410, a number of frames of the film to be fed to initial loading, that is, "4", is set to a software counter, and then at step CS412, forward rotation of the release motor $M_1$ is started. Then at step CS414, the control CPU 200 waits until completion of upward movement of the main mirror. Then, after an upward movement completion detecting switch not shown has been operated at step CS414, rotation of the motor $M_1$ is stopped at step CS416, and then the control CPU 200 waits for a little time (for example, 30 msec.), whereafter initial loading of a film is performed at step CS420 by the winding-up subroutine "SUB-C2" shown in FIG. 10. It is to be noted that the waiting time at step CS418 is intended to provide an interval of time during which the motor $M_1$ is stopped when the motor M 241 is changed over from the forward rotation to the reverse rotation in order to reduce a possible burden to the power source system which may be resulted from a back electromotive force produced in the motor $M_1$.

Subsequently at step CS422, the software counter is decremented, and then at step CS424, it is determined whether or not contents of the software counter are zero. If the result of the determination is negative, the program returns to step CS412, but on the contrary if the result is affirmative, the program advances to step CS426. Accordingly, upon initial winding of a film, operations from step CS412 to step CS424 are repeated four times. Thus, after completion of film feeding operations by four releasing operations, a state of the film detecting switch SWsls is checked at step CS426, and in case the switch SWsls is off and hence a film has been wound properly into the camera, the frame count b55 to b50 of the serial register is set to a binary number of "000001" at step CS428. But on the contrary in case the switch SWsls is on at step CS426 and hence a film has not been wound properly into the camera, the frame count b55 to b50 is cleared to zero ("000000") at step CS430.

Then in either case, the program advances to step CS432 at which the ISO display instruction b37 of the serial data register is cleared, and then to step CS434 at which the serial data of the serial data register are transmitted to the display circuit 500, whereafter the program returns to the original routine. Accordingly, during initial loading, a sensitivity value of the film loaded in the camera is automatically read in and displayed on the display device 600, and when the initial loading is completed, the display of the ISO value is canceled and instead a frame count is now displayed on the display device 600. At this instant, if the frame count display is "1", this means that a film is wound properly in the camera, but on the contrary if the frame count display is "0", this means that no film is loaded in the camera or else initial loading has not been functioned properly and hence a loaded film has not been wound properly by a predetermined amount.

Now, operation of the display circuit 500 will be described. Table 2 illustrates the contents of a liquid crystal driving data storage register (display RAM) of the display circuit 500.

TABLE 2

| DISPLAY bit RAM ADDRESS | $b_3$ | $b_2$ | $b_1$ | $b_0$ | | | |
|---|---|---|---|---|---|---|---|
| $d_0$ | 3b | 3a | 3c | (627) | ⎤ ⎦ | Third figure | |
| $d_1$ | 3g | 3f | 3e | 3d | | (633) | |
| $d_2$ | 2b | 2a | 2c | (626) | ⎤ ⎦ | Second figure | |
| $d_3$ | 2g | 2f | 2e | 2d | | (623) | |
| $d_4$ | 1b | 1a | 1c | (625) | ⎤ ⎦ | First figure | Display circuit |
| $d_5$ | 1g | 1f | 1e | 1d | | (631) | (600) |
| $d_6$ | LOAD (611) | FILM (612) | END (613) | (624) | | | |
| $d_7$ | ISO (614) | (621) | (622) | (623) | | | |
| $d_8$ | [M] (602) (702) | PROGRAM (601) (701) | (615) (733) | (634) | | | |
| $d_9$ | | 4f (732) | 4e | 4d | ⎤ ⎦ | First figure (711) | |
| $d_{10}$ | 4a | 4b | 4g | 4c | | | |
| $d_{11}$ | | 5f | 5e | 5d | ⎤ ⎦ | Second figure (712) | |
| $d_{12}$ | 5a | 5b | 5g | 5c | | | Display |

TABLE 2-continued

| DISPLAY bit RAM ADDRESS | b₃ | b₂ | b₁ | b₀ | | |
|---|---|---|---|---|---|---|
| $d_{13}$ | | 6f | 6e | 6d | Third figure | Display (700) |
| $d_{14}$ | (714) 6a | 6b | 6g | 6c | (713) | |
| $d_{15}$ | | 7f | 7e | 7d | Fourth figure | |
| $d_{16}$ | (731) 7a | 7b | 7g | 7c | (721) | |
| $d_{17}$ | • | 8f | 8e | 8d | Fifth figure | |
| $d_{18}$ | (723) 8a | 8b | 8g | 8c | (722) | |

Figure 13:
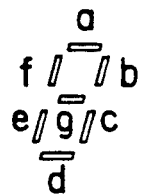
FIG. 13 is an illustration showing a set of segments for displaying a digit.

Referring to Table 2, 1a to 1g, 2a to 2g, ..., and 8a to 8g denote individual segments of seven-segment numeral display elements or patterns, and the suffixes a to g individually represent positions of segments as shown in FIG. 13.

In the present embodiment, the display circuit 500 is constituted from a 4-bit microcomputer and employs, as a driving method of liquid crystal display elements constituting the display devices 600, 700, a ¼-duty, ⅓-bias method. Thus, driving signals corresponding to bits b0, b1, b2, b3 of Table 2 are delivered from common terminals COM₀, COM₁, COM₂, COM₃ of the display circuit 500 which constitute the common data bus COM shown in FIG. 3. Meanwhile, driving signals corresponding to addresses d0 to d18 of the display RAM of the display circuit 500 are delivered from segment terminals S1 to S21 constituting the segment data bus SEG. Thus, such display elements as shown in FIGS. 4 and 5 can be provided on the display devices 600 and 700 in accordance with a matrix of signals from the common terminals COM and signals from the segment terminals SEG.

Figure 14:
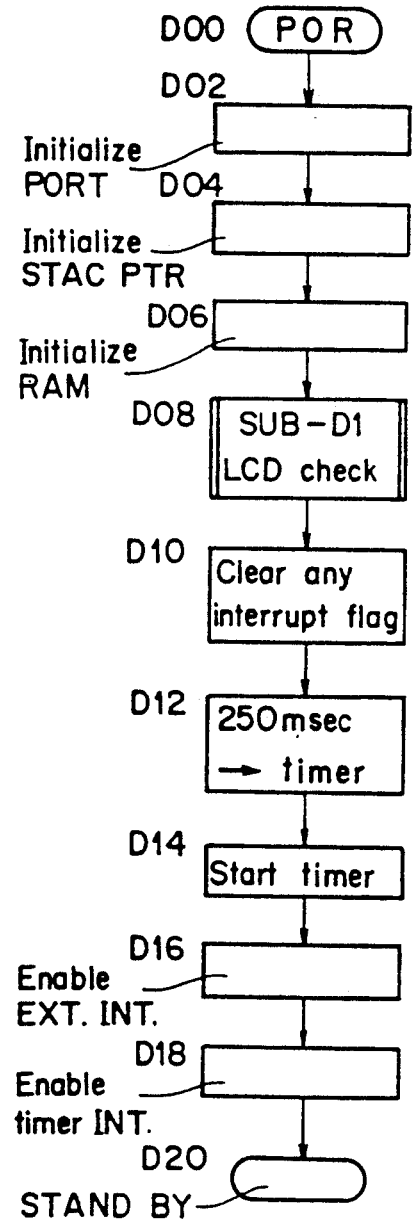

FIGS. 14 to 26 show flow charts of a program illustrating operations of the display circuit 500. FIG. 14 illustrates a power-on resetting routine which is executed when a power source battery is loaded into the camera. When power is supplied to the camera, a program counter of the display circuit 500 is compulsorily reset, and subsequently the display circuit 500 starts execution of the program from the routine shown in FIG. 14. At first at step D02, individual ports of the display circuit 500 constituted from a microcomputer are set to predetermined initial states, and then at steps D04 and D06, a stack pointer and the display RAM are initialized, respectively. Then at step D08, a subroutine "SUB-D1" is executed. This subroutine is a program for confirmation of operation of the display devices 600, 700 which may each be constituted from a liquid crystal display device and causes, only when a specific operation is made, the display devices 600, 700 to illuminate all the display elements thereof at a same time, but in any other case, the program returns to the original routine without causing the display devices 600, 700 to illuminate all the segments of the same. Details of operation in the subroutine "SUB-D1" will be hereinafter described with reference to FIG. 15.

After completion of execution of the subroutine "SUB-D1" at step D08, the program advances to step D10 at which various interrupt flags including an external interrupt flag, a timer interrupt flag and a serial interrupt flag all of which will be hereinafter described are cleared. Then, at step D12, a constant corresponding to 250 msec. is placed into a built-in time incorporated in the display circuit 500, and then at step D14, the timer is started. Subsequently at steps D16 and D18, an external interrupt (EXT. INT.) and a timer interrupt (TIMER INT.) are enabled, respectively, and then at step D20, system clocks are stopped so that the display circuit 500 enters a stand-by (halted) state. Here, in case the stand-by state is entered after interrupts have been enabled, subsequent occurrence of a request for an interrupt will return the display circuit 500 from its stand-by state to its normal operating state in order for the display circuit 500 to execute such interrupt processing. Further, even if the display circuit 500 enters the stand-by state at step D20, the oscillator circuit 503 continues its oscillation, and since clocks thus produced by the oscillator circuit 503 are continuously delivered to the timer, a request for an interrupt is generated from the timer incorporated in the display circuit 500 upon lapse of 250 msec. after execution of the step D18. Consequently, the display circuit 500 is escaped from the stand-by state and executes processing of the timer interrupt routine.

While details of the timer interrupt processing routine will be hereinafter described, the display circuit 500 is periodically (for 250 msec.) escaped from the stand-by state and can execute necessary processing in the timer interrupt processing routine. Further, also when a request for an interrupt is produced by a signal from outside while the display circuit 500 is in the stand-by state, the display circuit 500 is similarly escaped from the stand-by state and can execute necessary processing for the request for an interrupt.

Figure 15:
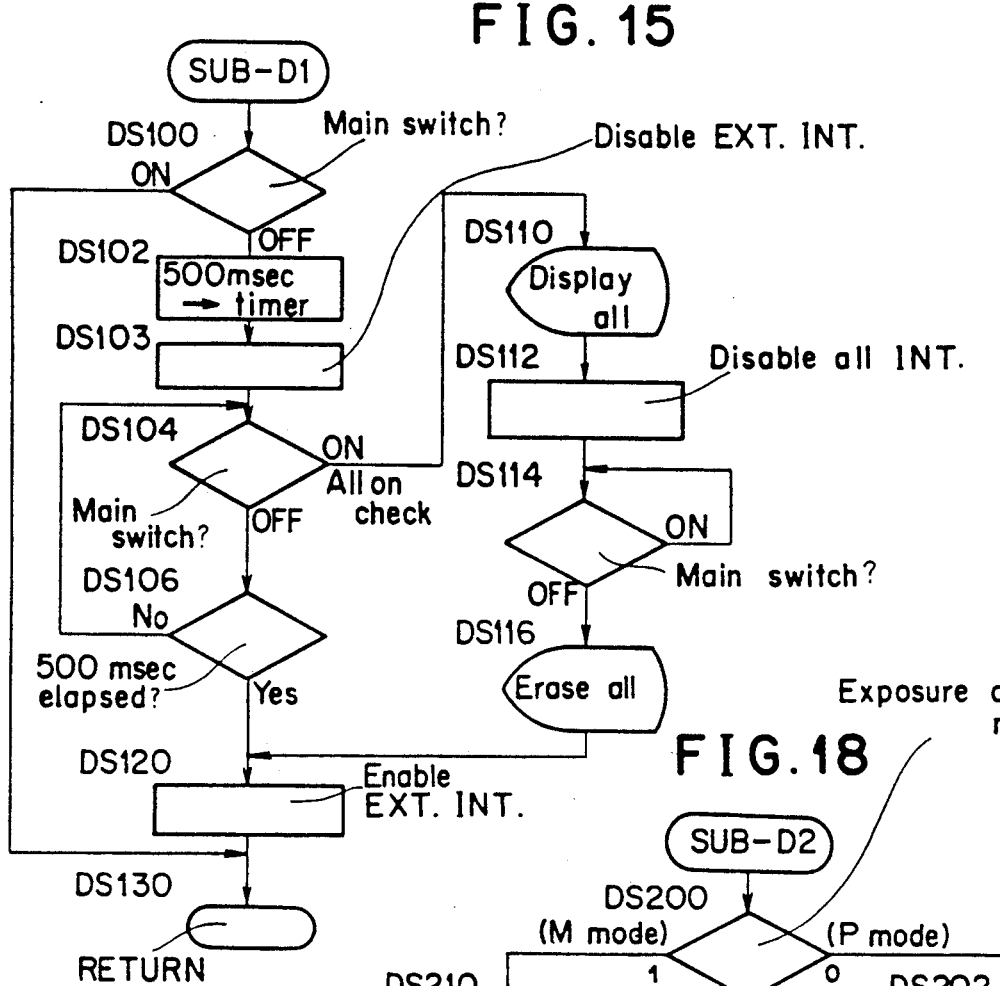

FIG. 15 shows a flow chart of the subroutine "SUB-D1" shown at step D08 of FIG. 14 for illuminating all the display elements of the display devices 600, 700. After the present subroutine has been entered at the step D08 of the power-on resetting routine shown in FIG. 14, a state of the switch SWm associated with the main switch 800 is read in, at first at step DS100, via an input port PORT of the display circuit 500, and if the input port PORT of the display circuit 500 to which the switch SWm is connected is at a "Low" level, the main switch 800 is at its "ON" position and accordingly the switch SWm is on. Thus, the program jumps to step DS130 at which the program returns to the original routine from which the present subroutine was entered. On the other hand, when the input port PORT of the display circuit 500 is at a "High" level at step DS100, the main switch 800 is at the "LOCK" position and accordingly the switch SWm is off. Thus, the program advances to step DS102 at which a constant corresponding to 500 msec. is placed into the built-in timer of the display circuit 500, and then to step DS103 at which an external interrupt (EXT. INT.) is disabled, whereafter a state of the switch SWm associated with the main switch 800 is read in again via the input port PORT and thus checked at step DS104.

If the input port PORT is at the "High" level and accordingly the main switch 800 is off, the program advances to step DS106 at which it is determined that the time of 500 msec. has elapsed at the built-in timer, and if it has not yet elapsed, the program returns to step DS104, but otherwise when the time of 500 msec. has at which an external interrupt (EXT. INT.) is enabled. Thereafter the program jumps to step DS130 to subsequently return to the original routine. On the other hand, in case the input port PORT of the display device 500 is at the "Low" level at step DS104 and accordingly the switch SWm associated with the main switch 800 is on, then the program jumps to step DS110 at which the addresses d1 to d21 of the display RAM are all set in order to illuminate all the display elements of the display devices 600, 700. After then, any interrupt is disabled at step DS112.

Subsequently at step DS114, a state of the switch SWm associated with the main switch 800 is checked further again, and so long as the switch SWm is on, the program circulates along a loop of the step DS114, and when the switch SWm is turned off, the program escapes from the loop to step DS116 at which all the addresses d1 to d21 of the display RAM are cleared in order to extinguish all the display elements of the display devices 600, 700. After then, an external interrupt (EXT. INT.) is enabled at step DS120, whereafter the program returns to the original routine.

Thus, if the operations in the subroutine shown in FIG. 15 described above are summarized, only when the switch SWm associated with the main switch 800 is off at the entrance of the present subroutine and then the main switch 800 is operated to change the switch SWm from off to on within the time of msec., all the display elements of the display devices 600, 700 are illuminated, but in any other case, the program returns to the original routine without executing a special operation. Then, when all the display elements of the display devices 600, 700 are illuminated, if the main switch 800 is operated again to return the switch SWm from the on state to the off state, all the illuminated display elements are extinguished. Thereafter, the program returns to the original routine so as to execute normal processing.

Table 3 illustrates contents of a blink flag register. Here, the blink flag register contains flags relating to blinking display operations of several display elements of the display devices 600, 700. Thus, only when contents of the register are all "0", blinking display is not achieved. If only one bit of a flag is set, processing for blinking display is executed. In particular, when contents of the blink flag register is not "0", the program jumps to a blinking display processing routine in which a display element or elements corresponding to a flag or flags in the set state are caused to blink in accordance with contents of a blink counter which will be hereinafter described.

Since the blink counter having 2 bits is incremented in the interrupt routine which is entered by an interrupt which occurs for each 250 msec. by the timer in the program of the display circuit 500 of the present embodiment as will be hereinafter described, the lower bit of the blink counter changes by 2 Hz while the upper bit changes by 1 Hz. Accordingly, by checking the blink counter in a blinking display processing routine which will be hereinafter described, the blinking period of the display element or elements can be selectively controlled to 2 Hz or 1 Hz for each kind of the flags.

Now, individual bits of the blink flag register shown in Table 3 will be described. At first F0 denotes a flag which is set when a film is not loaded properly in the camera, and the film loading warning display, that is, the blinking display "LOAD FILM" of the elements 611, 612, is provided with reference to the flag F0. F1 represents a flag which is set when photographing of all the available frames of a film is completed, and the film end warning display, that is, the blinking display "FILM END" of the display elements 612, 613, is provided with reference to the flag F1. Further, F2 denotes a flag which is set upon starting of rewinding of a film, and the film rewinding display, that is, the blinking display of the rewinding direction display element 623, is provided with reference to the flag F2 while rewinding is proceeding. F3 denotes a flag which is set upon completion of rewinding of a film, and the film removal warning display, that is, the blinking display of the magazine mark element 621, is provided with reference to the flag F3. F4 represents a flag which is set when dropping of a power source voltage is detected, and the battery exhaustion warning display, that is, the blinking display of the battery mark elements 615 and 733, is provided with reference to the flag F4.

Figure 16:
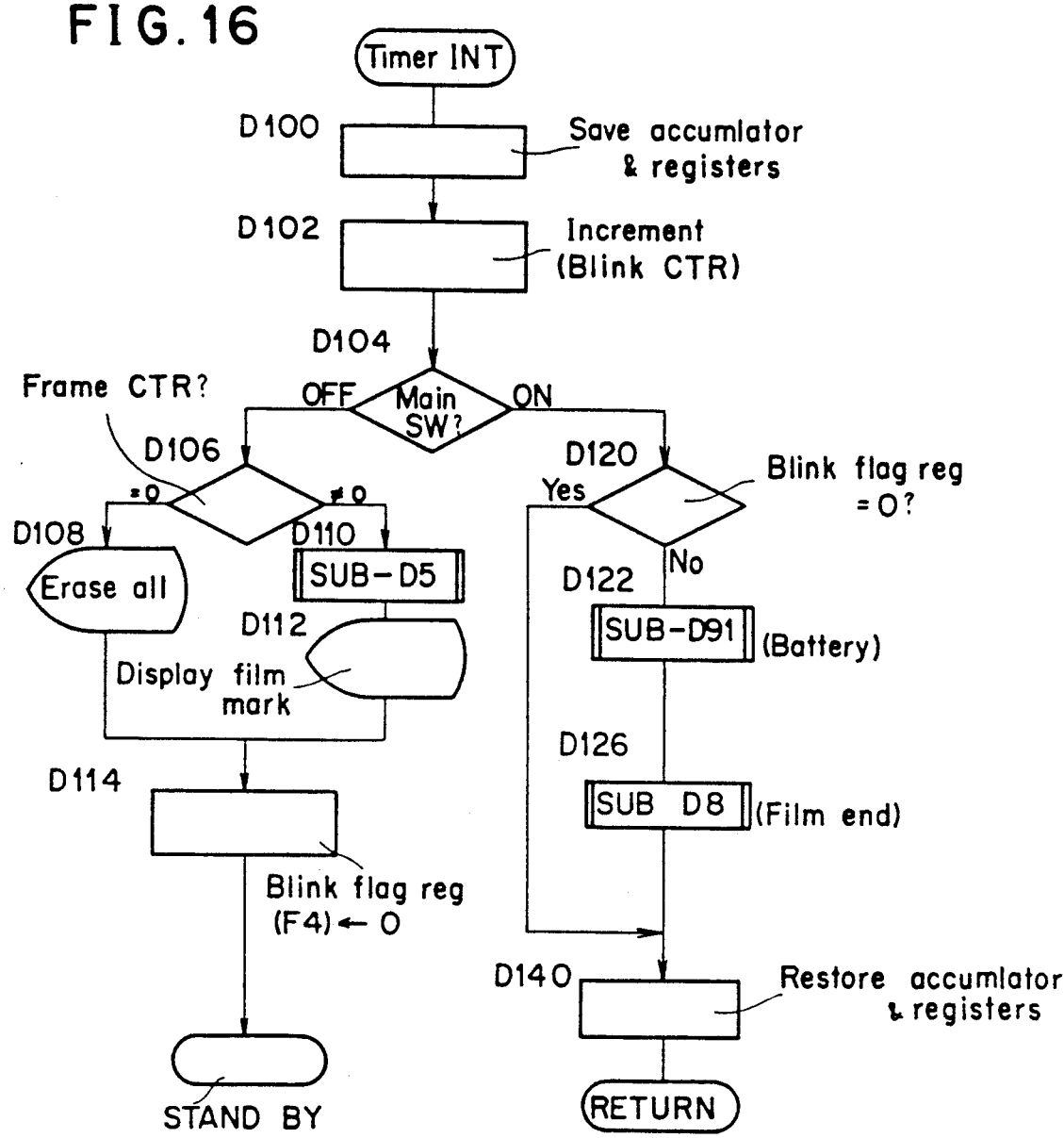

FIG. 16 shows a flow chart of the timer interrupt processing routine. The timer interrupt occurs for each 250 msec. as described hereinabove. Upon occurrence of a timer interrupt, the display circuit 500 saves, at step D100, contents of the accumulator and working registeres thereof and then increments the 2-bit blink counter at step D102. Then at step D104, a state of the main switch 800 is checked, and when the switch SWm associated with the main switch 800 is off, the program advances to step D106, but on the contrary when the switch SWm is on, the program advances to step D120.

Thus, when the main switch 800 is off, the frame count b55 to b50 of the serial data is checked at step D106, and when the value is not equal to zero, a subroutine "SUB-D5" is called at step D110 in order to provide a display of the frame count. Then at step D112, the bits b2 and b0 of the address d6 and the bit b2 of the address d7 of the display RAM are all set in order to provide displays of the character element "FILM" and

TABLE 3

| FLAG NAME | CONTENTS OF FLAG | 1 | 2 | MEANING OF BLINKING DISPLAY |
|---|---|---|---|---|
| F0 | FILM LOADED REGULARLY | NOT REG. | REG. | WARNING FOR LOADING OF FILM |
| F1 | FILM END | END | NOT END | FILM END, REQUESTING REW. |
| F2 | REWINDING INDICATION | DURING REW. | ELSE | DURING REW. |
| F3 | REWINDING COMPLETED | REW. COMPL. | ELSE | REW. COMPLETED, REQUESTING REMOVAL OF FILM |
| F4 | VOLTAGE DROPPED | VOLT. DROP | NORMAL | BATTERY EXHAUSTED | the magazine mark element 621 and the film set mark element 624.

On the other hand, when the frame count is zero at step D106 of FIG. 16, the addresses d0 to d18 of the display RAM are all cleared at step D108 in order to erase all the displays. Subsequently at step D114, the flag F4 of the blink flag register is cleared, whereafter the display circuit 500 enters its stand-by state. Also here in the stand-by state of the display circuit 500, the built-in timer of the display circuit 500 continues to operate, and accordingly another timer interrupt will occur after lapse of further 250 msec.

Meanwhile, when it is determined at step D104 that the main switch SWm is on, the blink flag register is checked at step D120, and when the blink flag register is zero, there is no necessity of execution of blinking display processing and accordingly the program jumps to step D140 at which the accumulator and working registers are restored to their respective original values, whereafter the program returns to the original routine. In case the contents of the blink flag register is not equal to zero at step D120, the program advances to step D122 and then to step D126 to successively call subroutines "SUB-D91" and "SUB-D8" for blinking display processing whereafter the program advances to step D140. In the subroutines "SUB-D91" and "SUB-D8", the display elements of the display devices 600, 700 are individually turned on or off in accordance with contents of the blink counter as will be hereinafter described. Accordingly, those display elements which are required to blink for display are all controlled to suitably blink at steps D122 and D126.

FIG. 17 shows the external interrupt processing routine of the display circuit 500. As the control CPU 200 changes the display circuit selecting signal CSDSP from the "High" level to the "Low" level, a request for an external interrupt is given to the display circuit 500. Thus, when the display circuit 500 is in an external interrupt enabling state, processing of the routine shown in FIG. 17 is initiated. It is to be noted that also when the display circuit 500 is in its stand-by state, the display circuit 500 is activated by a request for an external interrupt to execute the routine of FIG. 17.

In the present embodiment, each time the serial data are delivered by one byte (8 bits) from the control CPU 200 to the display circuit 500, a serial flag not shown provided within the display circuit 500 is set. The display circuit 500 can check or clear the serial flag by software and can thus detect a state of the serial flag to determine whether or not transmission of one byte is completed. It is to be noted that the display circuit 500 includes a 3-bit counter not shown for counting the number of bits of the serial data transmitted, and the serial flag is set when one byte of the serial data is counted by the 3-bit counter. The 3-bit counter can be cleared by software.

Referring to FIG. 17, upon occurrence of an external interrupt, the display circuit 500 save, at first at step D200, contents of the accumulator and working registers, and then at step D202, calls a subroutine "SUB-D6" which will be hereinafter described to fetch serial data transmitted thereto from the control CPU 200. Subsequently at step D204, a serial end flag is checked. Here, the serial end flag is a flag which is set or cleared in the subroutine "SUB-D6" described hereinbelow and is set to "1" when the serial data transmitted are completely received by the display circuit 500 but is cleared to "0" when they are not received completely.

Then at step D204, a state of the serial end flag is checked, and when the flag is "0", the program jumps to step D240 at which the accumulator and working registers are restored to their respective original values, whereafter the program returns to the original routine. This corresponds to a case wherein new information is not received as serial data even if an external interrupt occurs, and accordingly there is no task to be processed in the present routine.

Meanwhile, in case the serial end flag is "1" at step D204, the program advances to step D210 at which a subroutine "SUB-D9" which will be hereinafter described is called to provide a display of a result of checking of the battery based on the new serial data. Then, the program advances to step D212 at which another subroutine "SUB-D5" which will be hereinafter described is called in order to provide a display of the frame count and then to step D214 at which a state of the main switch SWm is checked. In case the main switch SWm is off here at step D214, only the result of battery checking and the frame count are displayed at steps D210, D212, respectively, and then the program jumps to step D240 at which the accumulator and working registers of the display circuit 500 are restored to their respective original values, whereafter the program returns to the original routine. On the other hand, in case the main switch SWm is on at step D214, the program advances to step D216 at which the bit b37 of the serial data is checked, and if b37="1", the this means that the display devices 600, 700 are in the ISO value display mode and accordingly the program jumps to step D230 at which a subroutine "SUB-D4" which will be hereinafter described is called in order to display the ISO value and then to step D240, whereafter the program returns to the original routine. Meanwhile, if b37="0" at step D216, then the program advances to step D220 at which a subroutine "SUB-D2" which will be hereinafter described is called in order to display the exposure control mode and then to step D222 at which another subroutine "SUB-D3" which will be hereinafter described is called in order to provide a display of the aperture value (Av value) and the shutter speed value (Tv value) and then to step D224 at which a further subroutine "SUB-D7" which will be hereinafter described is called in order to provide a display regarding a film feeding condition, whereafter the program jumps to step D240 and then returns to the original routine.

Figure 18:
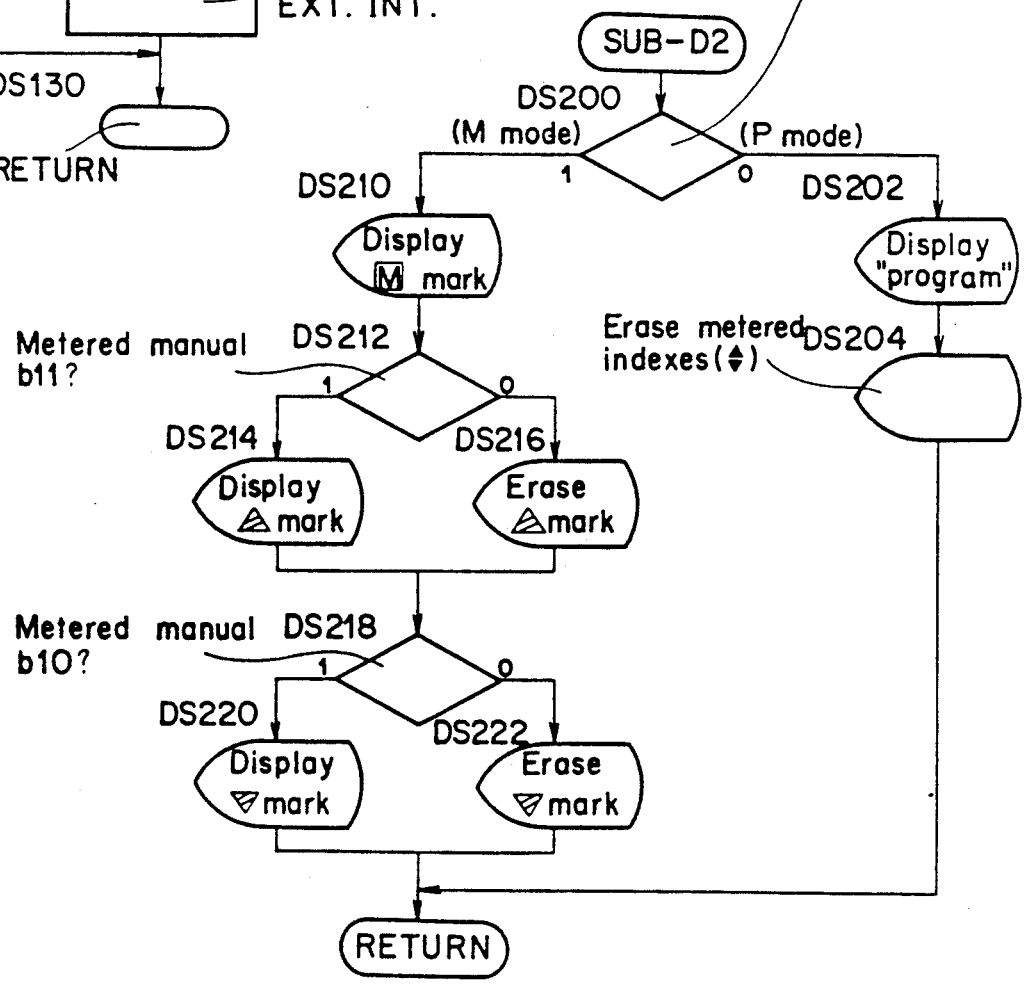

FIG. 18 shows a flow chart of the subroutine "SUB-D2" for display of the exposure control mode which is shown at step D220 of FIG. 17. Referring to FIG. 18, the display circuit 500 detects, at first at step DS200, the bib b47 of the serial data transmitted thereto from the control CPU 200 to judge the exposure control mode, and when the exposure control mode is the program mode, the program jumps to step DS202, but on the contrary when the exposure control mode is the manual mode, the program jumps to step DS210. Thus, in the case of the program mode, "0" and "1" are written into the bits b3 and b2 of the address d8 of the display RAM and consequently a display of the program mode is provided. Here, since the segment data but SEG which transfers output signals of the address d8 of the display RAM is connected commonly to the display device 600 on the camera body 1 and the display device 700 within the finder, a display of the program mode is provided simultaneously on both of the display devices 600, 700. Then at step DS204, the bit b3 of the address d9 and the bit b3 of the address d15 of the display RAM are cleared and consequently the displays of the index elements 732, 731 for display of the metered manual are erased, whereafter the program returns to the original routine.

On the other hand, when it is determined at step DS200 that the exposure controlling mode is the manual mode, "1" and "0" are written, at step DS210, into the bits b3 and b2 of the address d8 of the display RAM and consequently a display of the manual mode is provided, whereafter displays of the indexes of the metered manual are provided at steps DS212 to DS222. In particular, the bit b11 of the serial data is checked at step DS212, and if b11="1", then the bit b3 of the address d15 of the display RAM is set to "1" at step DS214 in order to provide a display of the mark element 731, but on the contrary if b11="0", then the bit b3 of the address d15 of the display RAM is reset at step DS216 in order to erase the display of the mark element 731. In either case, the bit b10 of the serial data is checked at step DS218, and if b10="1" here, then the bit b3 of the address d9 of the display RAM is set in order to provide a display of the mark element 732, but on the contrary if b10="0", then the bit b3 of the address d9 of the display RAM is cleared in order to erase the display of the mark element 732, whereafter the program returns to the original routine.

Figure 19:
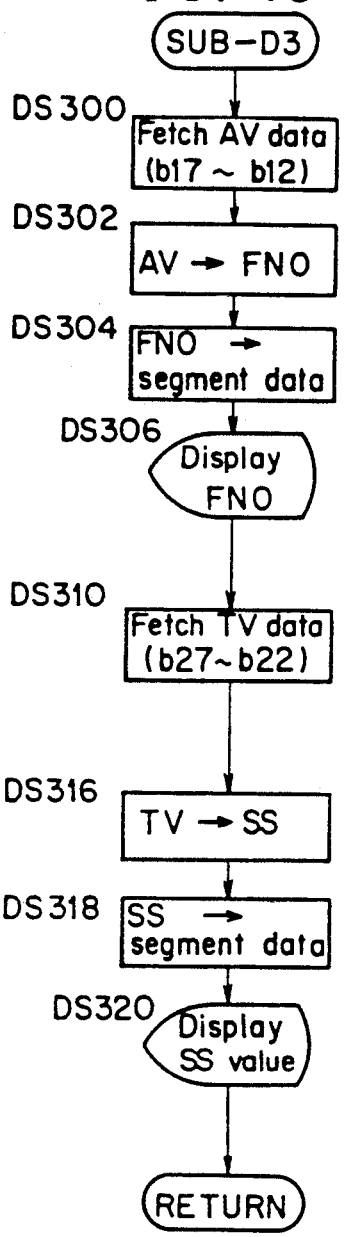

FIG. 19 shows a flow chart of the subroutine "SUB-D3" for display of the aperture value (Av value) and the shutter speed value (Tv value) which is shown at step D222 of FIG. 17. Referring to FIG. 19, at first at step DS300, signals of the bits b17 to b12 of data indicating an aperture value (Av value) are taken into the accumulator of the display circuit 500 from the serial data register. The signals are then converted into a corresponding F-number at step DS302, and then at step DS304, the F-number thus obtained is further converted into segment data for display. Then at step DS306, the segment data are transferred to corresponding addresses d15 to d18 of the display RAM in order to provide a display of the F-number on the display device 700.

Subsequently at step DS310, the bits b27 to b22 of data indicating a shutter speed value (Tv value) are taken into the accumulator from the serial data register, and then the TV value data is converted, at step ds316, into a shutter speed value and then, at step DS318, further into a corresponding segment data. Then at step DS320, the segment data is transferred to the corresponding addresses d9 to d14 (refer to Table 2 above) of the display RAM in order to provide a display of the shutter speed value on the display device 700, whereafter the program returns to the original routine.

FIG. 20 shows a flow chart of the ISO value display subroutine "SUB-D4" shown at step D230 of FIG. 17. Referring to FIG. 20, at first at step DS400, a film sensitivity value (Sv value) is fetched from the bits b36 to b30 of the serial data, and then at step DS402, the film sensitivity value (Sv value) is converted into a corresponding ISO value and then, at step DS404, further into a segment data for display of the ISO value on the display device 600. Then at step DS406, the addresses d0 to d18 of the display RAM are all cleared in order to erase all the display of the display device 600, and then at step DS408, the formerly fetched segment data regarding the film sensitivity is transferred to the addresses d9 to d14 of the display RAM in order to provide a display of the ISO value on the display device 600, whereafter the program returns to the original routine.

Figure 21:
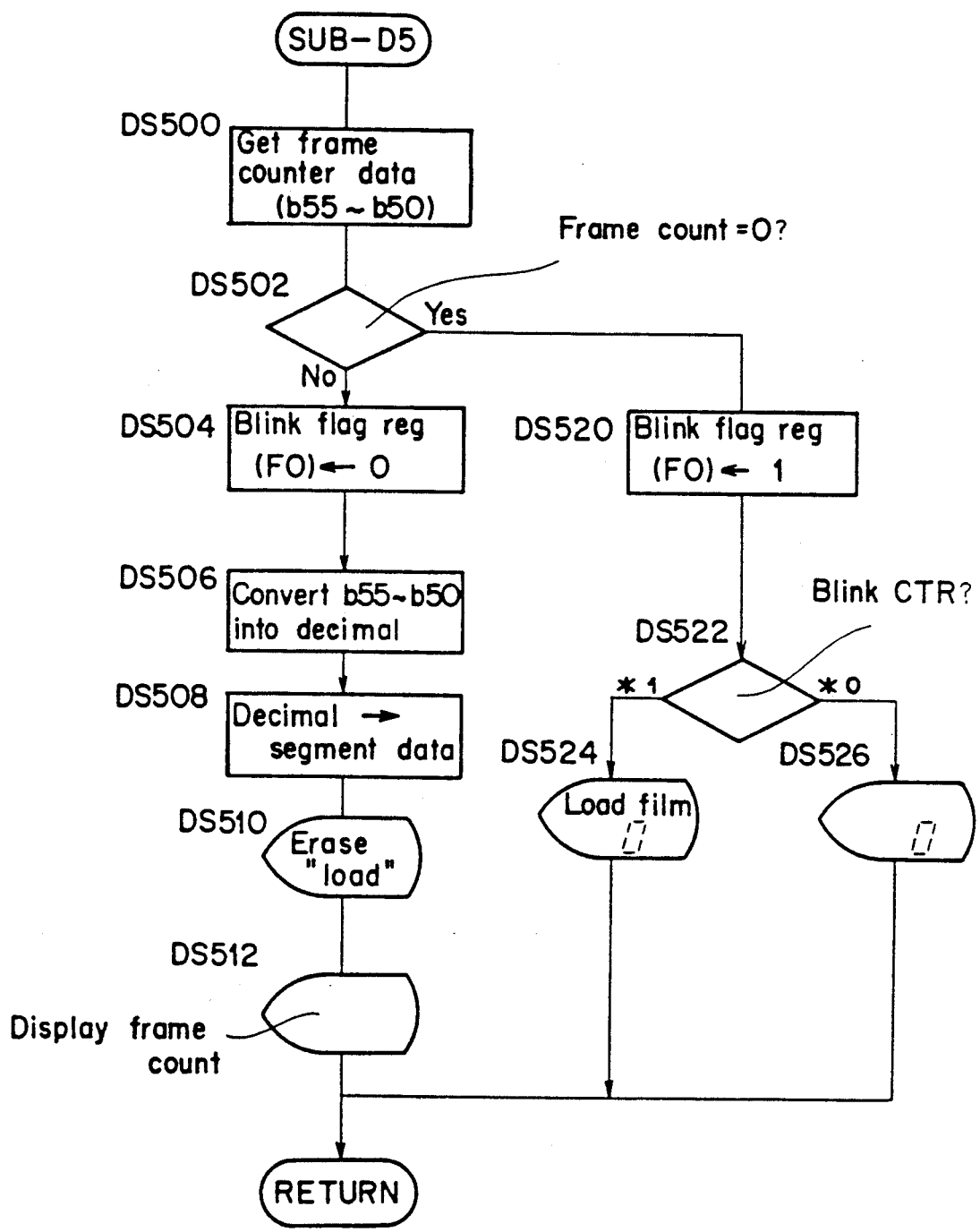

FIG. 21 shows a flow chart of the subroutine "SUB-D5" for display of a frame count which is shown at step D212 of FIG. 17. Referring to FIG. 21, a frame count is fetched at step DS500 as a binary data from the bits b55 to b50 of the serial data, and then it is determined at step DS502 whether or not the data thus fetched is "0". If the frame count is not "0" at step DS502, then the program advances to step DS504 at which the flag F0 of the blink flag register is cleared and then to step DS506 at which the frame count in the form of binary data is converted into a decimal number which is further converted at step DS508, into a segment data for display on the display device 600. Then at step DS510, the bit b2 of the address d6 of the display RAM is set while the bit b3 of the same is cleared in order to erase the display of the character element "LOAD" of displayed, and then at step DS512, the segment data of the frame count is transferred to the addresses d9 to d12 of the display RAM in order to provide a display of the frame count on the display device 600, whereafter the program returns to the original routine.

On the other hand, if it is determined at step DS502 that the frame count is "0", this probably means that no film is loaded in the camera or else initial loading of a film has not been performed properly by some reasons, and therefore the program branches to step DS520 at which the flag F0 of the blink flag register is set. Then at step DS522, the lowermost bit of the blink counter is checked, and in accordance with a result of the check, a display of the character elements "LOAD FILM" is provided or erased at step DS524 or DS526, respectively, whereafter the program returns to the original routine.

Figure 22:
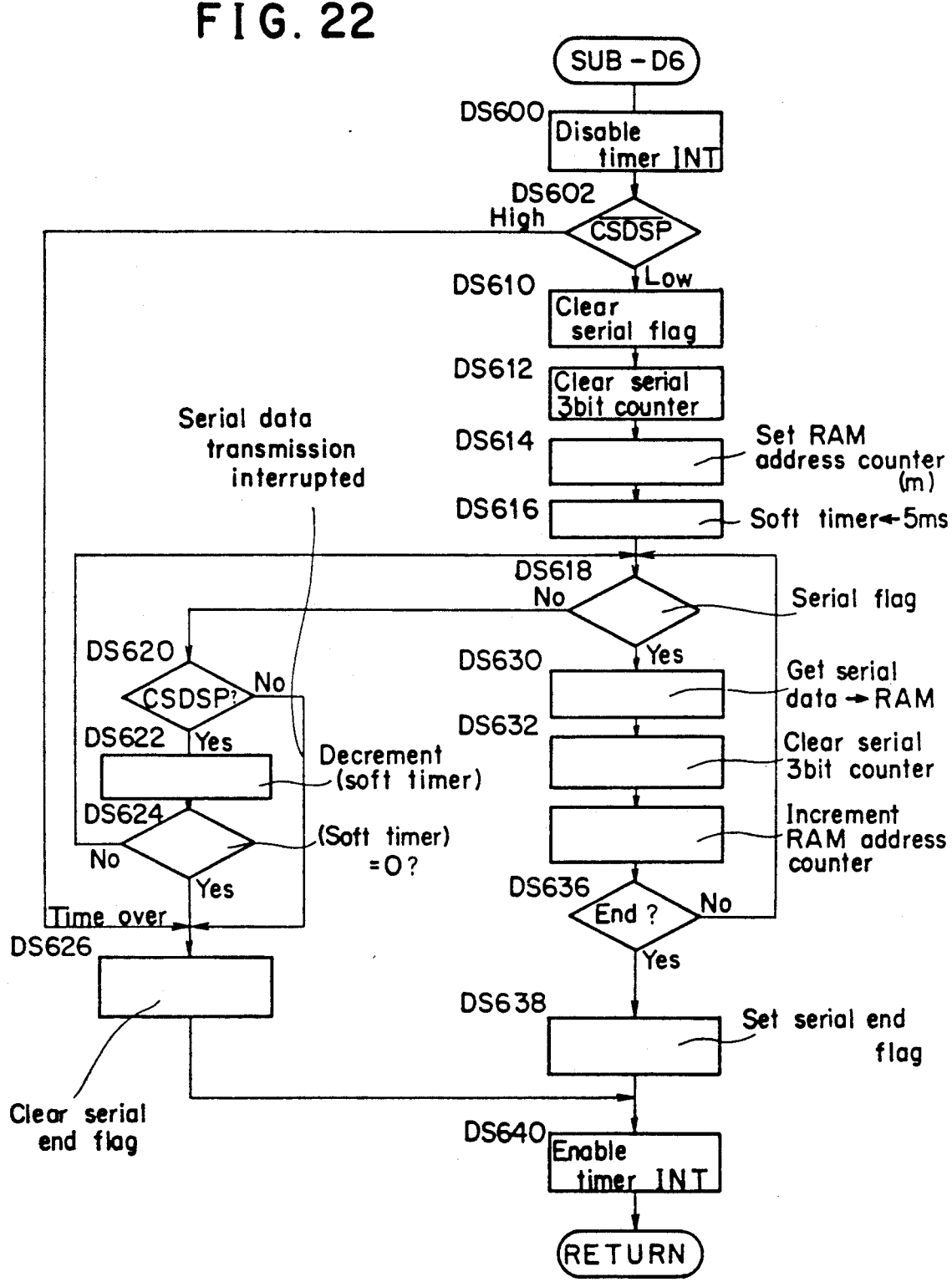

FIG. 22 shows a flow chart of the serial data fetching subroutine "SUB-D6" shown at step D202 of FIG. 17. Referring to FIG. 22, at first at step DS600 at the entrance of the subroutine, a timer interrupt is disabled. This is intended to execute processing of serial data in prior to processing of a timer interrupt and is thus constituted such that when a request for a timer interrupt is generated during processing of serial data, the request is held during such processing and then after completion of the processing of the serial data, a timer interrupt is enabled to execute processing of timer interrupt of the request thus held.

Subsequently at step DS602, a state of the display circuit selecting signal CSDSP received at the external interrupt terminal INT of the display circuit 500 is judged by software. Then, if the display circuit selecting signal CSDSP is "High", this means that serial data transmission is not achieved properly and therefore the program jumps to step DS626 at which the serial end flag is cleared. After then, the program jumps to step DS640 at which the disabling of a timer interrupt is canceled, and then the program returns to the original routine. On the other hand, if it is determined at step DS602 that the display circuit selecting signal CSDSP is "Low", the program advances to step DS610 because regular serial data transmission is achieved.

Steps DS610 to DS638 provide a processing routine for reading serial data transmitted from the control CPU 200 into the display circuit 500. At first at step DS610, the serial flag is cleared because the display circuit 500 must be in a state wherein it waits serial data to be transmitted thereto. Then at step DS612, the 3-bit counter not shown for counting serial data for one byte (8 bits) is cleared, and then at step DS614, a top address (represented as "m" in the present embodiment) of the display RAM into which serial data are to be stored is set to the address pointer of the RAM in preparation for reception of serial data. Subsequently at step DS616, data corresponding, for example, to "5 msec." is placed into a software timer, and then it is checked at step DS618 whether or not the serial flag is in the set state. If the serial flag is not in the set state at step DS618, the program advances to step DS620 at which the display circuit selecting signal CSDSP is checked again. Then, if the display circuit selecting signal CSDSP still remains at the "Low" level at step DS620, the display circuit 500 determines that serial data transmitting condition still continues and thus advances the program to step DS622 at which the software timer which was set to "5 msec." at step DS616 is decremented. Then, contents of the software timer are checked at step DS624, and if the contents of the software timer are not "0", the program jumps to step DS618, but on the contrary if the contents are "0", the program jumps to step DS626.

To the contrary, if it is determined at step DS620 that the display circuit selecting signal CSDSP is "High", the program jumps to step DS626 at which the serial end flag is cleared and further to step DS640 at which the disabling of a timer interrupt is canceled, whereafter the program returns to the original routine. In particular, in case transmission of serial data is interrupted before completion of transmission of the entire serial data by some reasons despite that such transmission of serial data has been notified to the display circuit 500 by the display circuit selecting signal CSDSP, the display circuit selecting signal CSDSP will be changed to "High" before the serial flag is set. Accordingly, this situation is judged at step DS620, and consequently the program returns to the original routine after step DS626. Further, also in case the serial flag is not set within a predetermined time ("5 msec." set to the software timer) after transmission of serial data has been notified to the display circuit 500 by the display circuit selecting signal CSDSP, such transmission of serial data is determined to be invalid and consequently the program returns to the original routine via step DS626.

To the contrary, while normal transmission of serial data is proceeding, the program of the display circuit 500 circulates along a loop of steps DS618 and DS620 to DS624, but shortly if serial data are received for one byte (8 bits) and consequently the serial flag is set, this is detected at step DS618 and accordingly the program now jumps to step DS630 in order to take the transmitted serial data into the display circuit 500. Thus, at first at step DS630, the serial data received in the serial data register are taken in and are stored into a RAM portion of an address represented by the address pointer of the RAM, and then at step DS632, the 3-bit counter for counting a number of serial bits is cleared. Then at step DS634, the address pointer of the RAM is incremented. Subsequently at step DS636, contents of the address pointer of the RAM are checked, and if a predetermined value ("m+5" in the present embodiment) is not reached here, the program returns to step DS618 in order to wait for reception of further serial data to be transmitted subsequently. On the contrary, if contents of the address pointer of the RAM are equal to the predetermined value ("m+5") at step DS636, the program jumps to step DS638. Accordingly, in the program of the display circuit 500 in the present embodiment, if a loop of steps DS618 and DS630 to DS636 is passed by five times as a result of transmission of serial data, the program will escape to step DS638, thereby completing taking in of the serial data transmitted. Then at step DS638, the serial end flag is set, and then at step DS640, the disabling of a timer interrupt is canceled, whereafter the program returns to the original routine.

Figure 23:
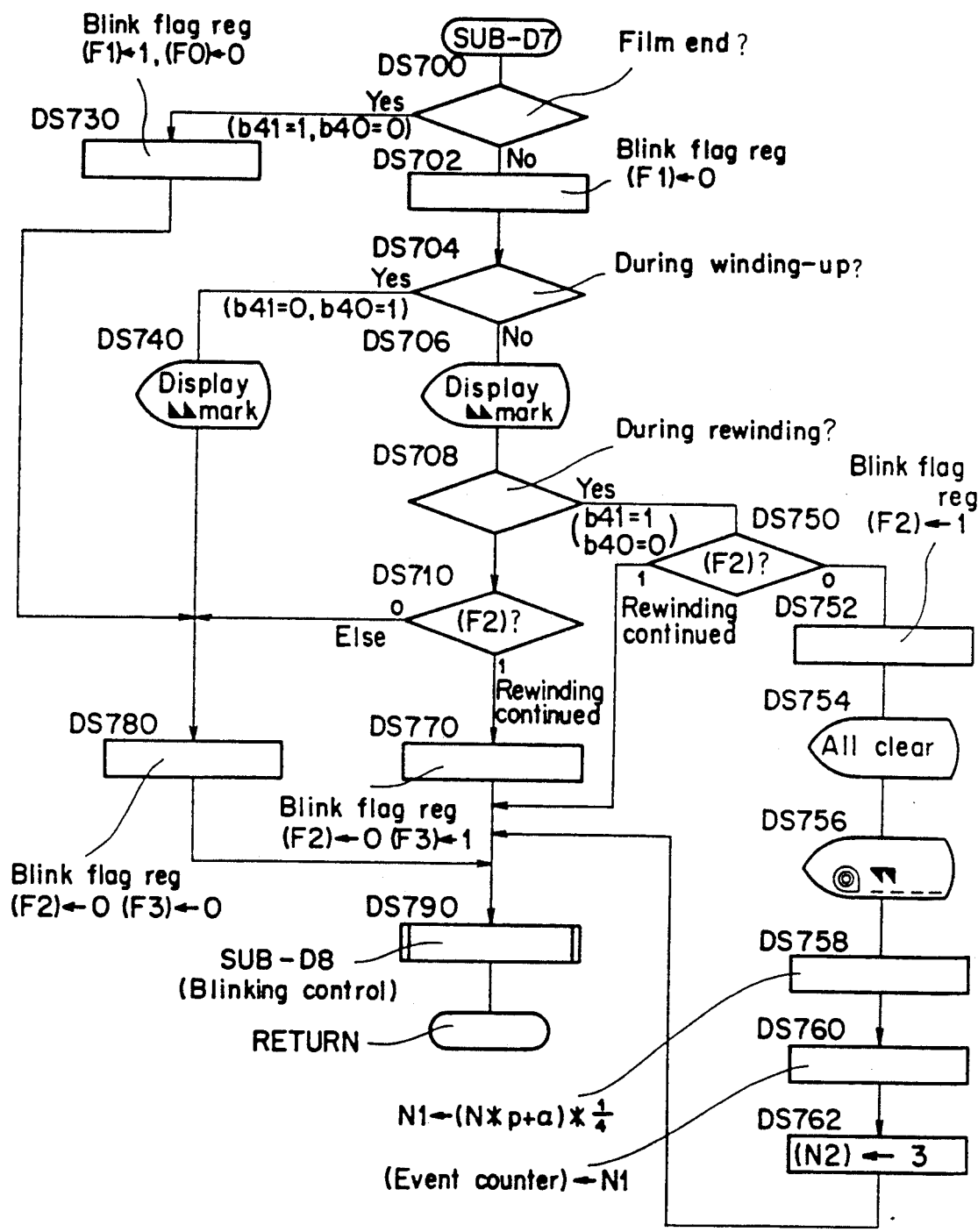

FIG. 23 shows a flow chart of the subroutine "SUB-D7" for display regarding winding-up and rewinding of a film which is shown at step D224 of FIG. 17. Referring to FIG. 23, at first at step DS700, the bits b41, b40 of the serial data are checked to determine whether or not a film end condition wherein winding-up of all photographable frames of a film is completed is reached, and in case of such a film end condition (b41="1", b40="1"), the program branches to step DS730. On the contrary, in case the film end condition is not reached at step DS700, the program advances to step DS702 at which the flag F1 of the blink flag register is cleared and then to step DS704 at which the bits b41, b40 of the serial data are checked again to determine whether or not a film is being woundup. Thus, when it is determined that a film is being wound-up (b41="0", b40="1"), the program branches to step DS740. On the contrary, if it is determined at step DS704 that a film is not being wound-up, then the bit b0 of the address d7 of the display RAM is cleared at step DS706 in order to erase the display of the display element 623 which indicates that the film is being wound-up, and then the bits b41, b40 of the serial data are checked again at step DS708 to determine whether or not the film is being rewound. Thus, if the film is being rewound (b41="1", b40="0"), the program branches to step DS750. On the contrary if the film is not being rewound at step DS708, the flag F2 of the blink flag register is checked, and if the flag F2 is "1" and accordingly a rewinding operation has been just completed (details will be hereinafter described), the program branches to step DS770. On the contrary when the flag F2 is "0" at step DS710, that is, in any case other than those described above, the program advances to step DS780 at which the flags F2, F3 of the blink flag register are both cleared to "0" and then to step DS790.

Meanwhile, in case the film end condition (b41="1", b40="1") is determined at step DS700, the flag F1 of the blink flag register is set to "1" while the flag F0 is cleared to "0" at step DS730, and then the program jumps to step DS780. On the other hand, in case it is determined at step DS704 that the film is being wound-up (b41="0", b40="1"), the bit b0 of the address d7 of the display RAM is set at step DS740 in order to illuminate the display element 623 which indicates that the film is being wound-up, and then the program jumps to step DS780.

To the contrary, in case it is determined at step DS708 that the film is being rewound (b41="1", b40="0"), the flag F2 of the blink flag register is checked at step DS750. The flag F2 is set upon starting of display of rewinding of a film and reset upon termination of display of the film rewinding. Accordingly, if the flag F2 is "0" at step DS750, this means that a film rewinding condition has been just entered and accordingly the program advances to step DS752 in order to execute rewinding display starting processing. Thus, at first at step DS752, the flag F2 of the blink flag register is set to "1", and then at step DS754, all the addresses of the display RAM are cleared, whereafter a rewinding initial display is provided at step DS756. Here, the rewinding initial display is provided such that the bits b0 of the addresses d1, d3, d5, d7 and d9 of the display RAM are all set so that the magazine mark element 653, the rewinding bar graph display elements 654 to 657 and the rewinding mark element 652 are displayed on the display device 600.

Subsequently at step DS758, a calculation of a following expression is executed in accordance with a current frame count "N" (data of the bits b55 to b50 of the serial data):

$$N1=(N\times P+a)\times(\tfrac{1}{4})$$

(here, N1 is rounded to an integer). Then at step DS760, the value N1 thus obtained is placed into an event counter, and then a value "3" is placed into a software counter N2 at step DS762, whereafter the program jumps to step DS790.

It is to be noted here that in the expression for calculation at step DS758, P is a number of pulses produced by on/off operations of the switch SWsp during film rewinding operation which corresponds to a length of one frame of a film, and $a$ is number of such pulses which corresponds to a length of a leader portion of the film. Accordingly, $N\times P+a$ represents a total number of pulses produced by on/off operations of the switch SWsp which are estimated to be produced over an entire stroke of the film to be rewound, and hence the value N1 calculated at step DS760 corresponds to one fourth of the total number.

On the other hand, if the flag F2 is "1" at step DS750, this means that rewinding display has been already started and accordingly the program jumps to step DS790 at which the rewinding mark element 622 is displayed in a blinking state. Meanwhile, if the flag F2 is "1" at step DS710, this means that a film is not being rewound and a display that a film is being rewound is being provided and accordingly rotation of the motor M2 242 is already stopped as a result of completion of film rewinding operation. Accordingly, the flag F2 representing that a display that a film is being rewound is being provided is cleared to "0" while the flag F3 representing completion of rewinding is set to "1" at step DS770, whereafter the program advances to step DS790 at which the magazine mark 621 is displayed in a blinking manner.

After such steps of processing as described above, the program jumps from step DS762, DS770 or DS780 to step DS790 at which blinking display control regarding winding-up and rewinding of a film is executed by the subroutine "SUB-D8", whereafter the program returns to the original routine.

Figure 25:
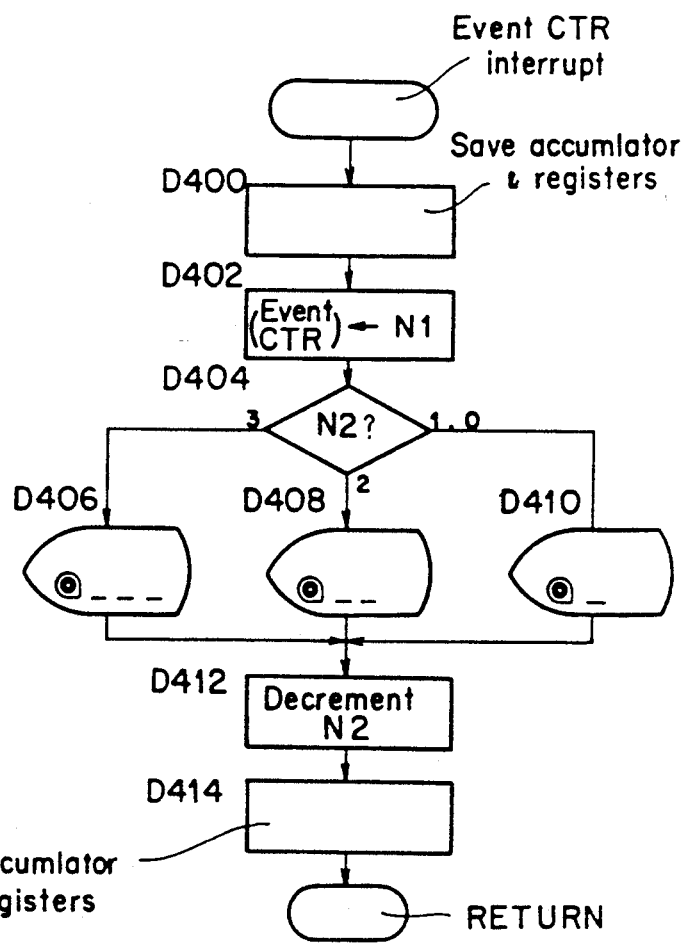

It is to be noted that while in the present embodiment the bar graph for illustrating a proceeding condition of film rewinding operation is displayed by the four bar elements as seen from the steps DS758 to 762 and as shown in FIG. 25, it is not limited to the specific number of bar elements. Where the number of bars of a bar graph is generally "n", the calculation at step DS758 will be achieved in accordance with a following modified expression:

$$N1=(N\times P+a)\times(1/n)$$

Thus, the operation at step DS762 will be modified such that a value "n−1" is placed into the software counter N2. Further, the number of branches at step D404 of the event counter interrupt routine of FIG. 25 which will be hereinafter described will be modified as "n−1".

As described hereinabove, the switch SWsp is the present embodiment is opened and closed in response to rotation of the film rewinding shaft. Here, since a film is accumulated on the rewinding shaft as rewinding of the film proceeds, the diameter of the film accumulated on the rewinding shaft gradually increases thereby to increase a number of frames of the film to be rewound by rotation of the rewinding shaft per unit rotational amount. Therefore, during such rewinding operation, the number of rewound frames of the film and the number of pulses generated by the switch SWsp do not vary in a strict proportional relationship to each other. Accordingly, where such on/off signals of the switch SWsp are used to detect a number of rewound frames of a film, it is impossible to provide a proper down count display of a number of rewound frames of a film as rewinding of the film proceeds. To the contrary, according to the present embodiment, in such a situation as described above, a proceeding condition of film winding operation can be visually and institutively seen from a graphic rewinding display by such a bar graph as described above. It is to be noted here that the present rewinding display means can be naturally applied also to a modified arrangement wherein the switch SWsp is constituted to the opened and closed in response to a sprocket or a like member so that pulses produced by the switch SWsp may have strict one-by-one relationship with feeding of a film.

Figure 24:
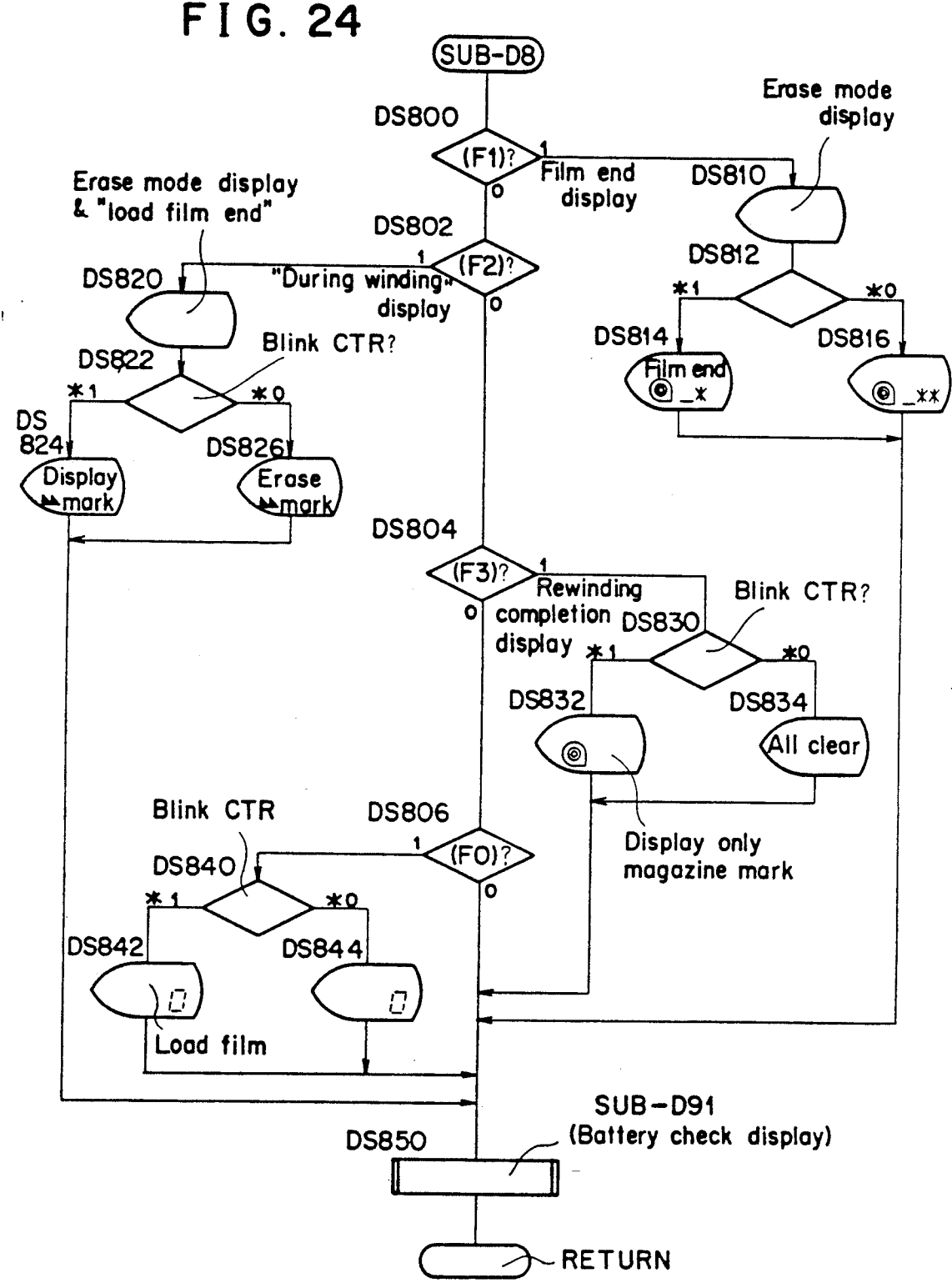

FIG. 24 shows a flow chart of the subroutine "SUB-D8" for controlling blinking of those display elements relating to winding-up and rewinding of a film which is shown at step D126 of FIG. 16 and also at step DS790 of FIG. 23. Referring to FIG. 24, the flag F1 of the blink flag register is checked at step DS800, and if the flag F1 is "1", then the program branches to step DS810 in order to provide a display for film end warning. On the contrary, if the flag F1 is "0", then the program advances to step DS802 at which the flag F2 is checked, and if the flag F2 is "1", then the program branches to step DS820 in order to provide a display of rewinding of a film. On the other hand, if the flag F2 is "0" at step DS802, then the program advances to step DS804 at which the flag F3 is checked, and if the flag F3 is "1", then the program branches to step DS830 in order to provide a display for warning of completion of film rewinding. Meanwhile, if the flag F3 is "0" at step DS804, the program advances to step DS806 at which the flag F0 is checked, and if the flag F0 is "1", then the program branches to step DS840 in order to provide a display for warning for loading of a film. On the contrary, if the flag F0 is "0" at step DS806, then the program jumps to step DS850 because all the flags of the blink flag register are zero after all and accordingly there is no necessity of making a blinking display regarding winding-up or rewinding of a film. Meanwhile, in case the flag F1 is "1" at step DS800, the bits b3, b2 of the address d8 of the display RAM are both cleared at step DS810 in order to erase the display of the exposure control mode, and then at step DS812, the lowermost bit of the blink counter is checked. In response to a result of such checking, the bits b2, b1 of the address d6 of the display RAM are set or cleared at step DS814 or DS816, respectively, in order to provide or erase a display of "FILM END" by lighting or extinguishing the character display elements 612, 613, whereafter the program jumps to step DS850.

In case the flag F2 is "1" at step DS802, the bits b3, b2 of the address d8 and the bits b3, b2, b1 of the address d6 of the display RAM are cleared at step DS820 in order to erase the display of the exposure control mode and the displays of the character elements "LOAD", "FILM", "END", and then at step DS822, the lowermost bit of the blink counter is checked. Thus, in response to a result of such checking, the bit b1 of the address d7 of the display RAM is set or cleared at step DS824 or DS826 in order to light or extinguish the rewinding mark element 622, respectively, and then the program jumps to step DS850.

In case the flag F3 is "1" at step DS804, the lowermost bit of the blink counter is checked at step DS830, and in response to a result of such checking, either the bit b2 of the address d7 of the display RAM is set at step ds832 or all the address of the display RAM are cleared at step DS834 in order to light or extinguish the magazine mark element 621, respectively, to display completion of the rewinding operation, whereafter the program jumps to step DS850. On the other hand, when the flag F0 is "1" at step DS806, the lowermost bit of the blink counter is checked, and in response to a result of such checking, the bits b3, b2 of the address d6 of the display RAM are set or cleared at step DS842 or DS844 in order to light or extinguish both of the character elements "LOAD" and "FILM" (zero is displayed as the frame count), whereafter the program jumps to step DS850. After such processings as described above, the subroutine "SUB-D91" for display of battery checking which will be hereinafter described is executed in any case at step DS850 in the present subroutine, whereafter the program returns to the original routine.

FIG. 25 shows a flow chart of the event counter interrupt processing routine. In the present embodiment, during rewinding of a film, a pulse train representative of a film rewinding condition is generated by the switch SWsp associated with the film rewinding mechanism and is coupled to the event counter input terminal EVENT CTR of the display circuit 500. Thus, the value N1 placed into the event counter at step DS760 in the subroutine "SUB-D7" shown in FIG. 23 is decremented each time a pulse of the pulse train is received, and finally as the value N1 is decremented to zero, a request for an interrupt is generated. Consequently, the routine shown in FIG. 25 is executed.

In the present routine, at first at step D400, contents of the accumulator nd working registers of the display circuit 500 are saved, and then at step D402, the formerly placed value N1 is placed once again into the event counter, whereafter a value N2 of the software counter is checked at step D404. If the value N2 of the software counter is "3", the three bar display elements 654, 655, 656 are lit for display at step D406, but otherwise if the value N2 of the software counter N2 is "2", then the two bar display elements 654, 655 are lit for display at step D408, or else if the value N2 of the software counter is "1", the one bar display element 654 is lit for display at step D410, whereafter the program advances to step D412. At step D412, the value N2 of the software counter is decremented, and then at step D414, the accumulator and working registers are restored to their respective original values, whereafter the program returns to the original routine.

Figure 26:
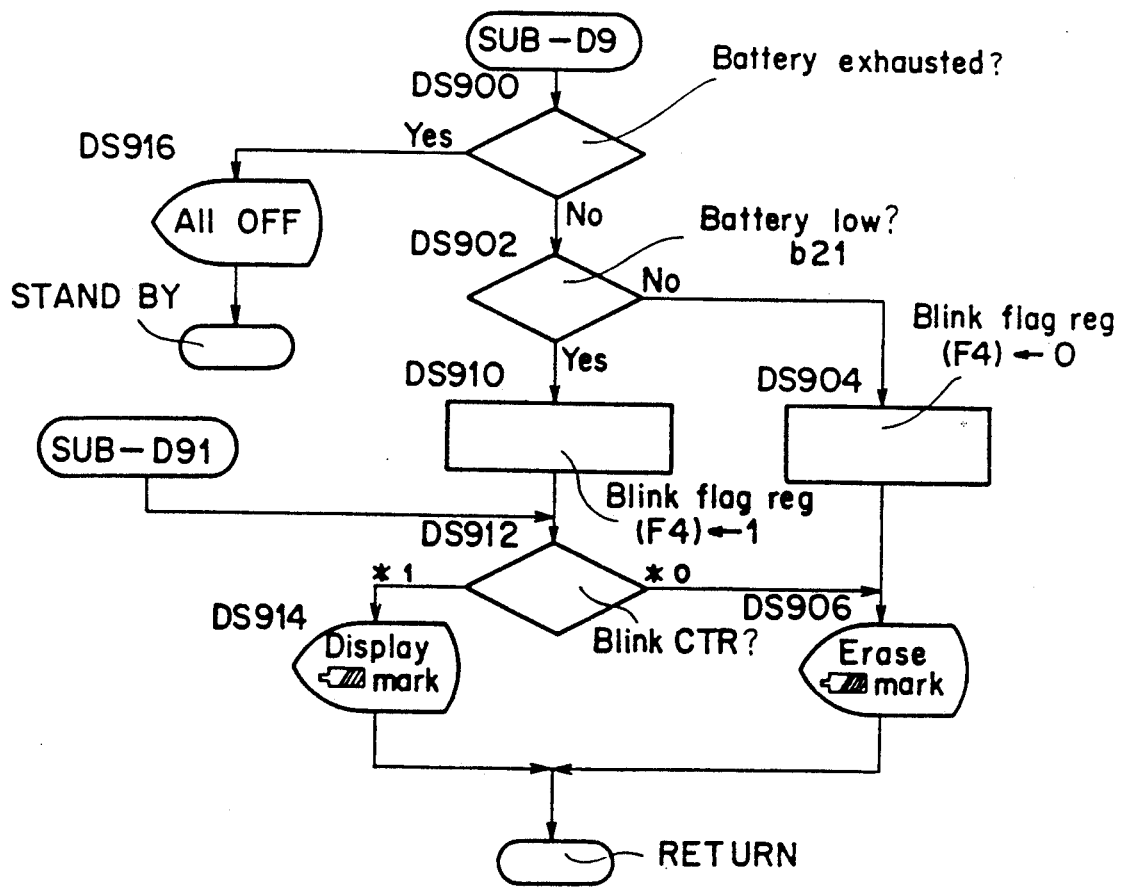

FIG. 26 shows a flow chart of the subroutine "SUB-D9" for display of battery checking which is shown at step D210 of FIG. 17. Referring to FIG. 26, at first at step DS900, the bit b20 of the serial data is checked, and in case the bit b20 is "1", this means that the battery is exhausted already and accordingly the program branches to step DS916 at which all the addresses d1 to d21 of the display RAM are cleared in order to erase all the displays (display of the locked state of the camera) of the display devices 600, 700, whereafter the display circuit 500 enters its stand-by state. On the contrary if the bit b20 of the serial data is "0", this means that functions of the camera need not be locked and accordingly the program advances to step DS902 at which the bit b21 of the serial data is checked to determine whether a battery exhaustion warning region is reached. Here, if the bit b21 is "0", this means that the battery still has sufficient power and accordingly the program advances to step DS904 at which the flag F4 of the blink flag register is cleared. Then at step DS906, the bit b1 of the address d8 of the display RAM is cleared in order to erase the display of the battery mark elements 615, 733, whereafter the program returns to the original routine. On the other hand, if the bit b21 of the serial data is "1" at step DS902, the flag F4 of the blink flag register is set at step DS910 in order to give a warning of battery exhaustion, and then at step DS912, the uppermost bit of the blink counter is checked. Here, if the uppermost bit of the blink counter is "1", then the battery mark elements 615, 733 are displayed at step DS914, but on the contrary if the uppermost bit of the blink counter is "0", then the program jumps to step DS906 at which the display of the battery mark elements 615, 733 is erased, whereafter the program returns to the original routine. Since the uppermost bit of the blink counter is reversed at 1 Hz as described hereinabove, blinking of the battery mark elements 615, 733 are controlled by 1 Hz.

The present routine "SUB-D9" has another entrance at step DS912. This entrance (subroutine "SUB-D91") is used to control blinking display of the battery mark elements 615, 733. In particular, even when the display circuit 500 is in its stand-by state, blinking display of the battery mark elements 615, 733 can be continued by calling the present subroutine "SUB-D91" at step D122 in the timer interrupt routine of FIG. 16 when the display circuit 500 is activated for each 250 msec. by a timer interrupt.

Figure 27A:
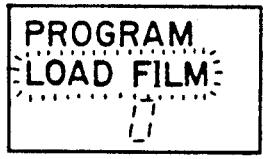
FIGS. 27a to 27k are illustrations showing various images displayed on the display device on the top of the camera of FIG. 1.
Figure 27B:
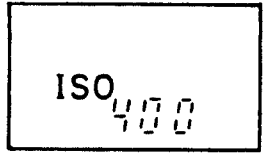
Figure 27C:
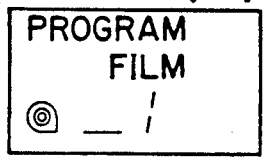

Now, manners, of display on the display device 600 on the camera body 1 as the routines and subroutines described hereinabove with reference to the flow charts of FIGS. 6 to 26 are executed will be described with reference to FIGS. 27a to 27k. At first, if the main switch 820 is shifted to the "ON" position when no film is loaded in the camera, the display device 600 presents such a display as shown in FIG. 27a wherein "0" is displayed on the frame counter and the character elements "LOAD FILM" are displayed a blinking manner to give a warning for loading of a film to a photographer. Then, if a film is placed into the camera and the rear cover of the camera is closed, then the film is automatically fed by four frames thereof (initial loading) and a film sensitivity is automatically read from a DX code recording on a magazine of the film. The film sensitivity value(ISO value) thus read is displayed in a manner as shown in FIG. 27b on the display device 600 during such initial loading. After completion of the initial loading, the display of the frame counter is changed to "1" and the character display element 612 of "FILM", the magazine mark element 621 and the film set mark element 624 are lit as seen in FIG. 27c. This display of FIG. 27c is normal display when the camera is normally in its stand-by state.

Figure 27D:
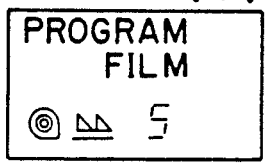
Figure 27E:
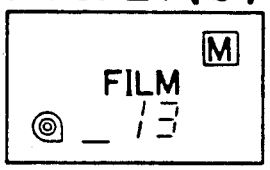
Figure 27F:
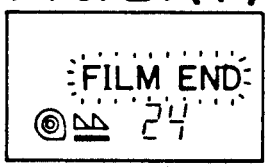
Figure 27G:
Figure 27H:
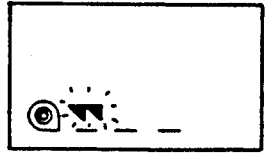
Figure 27I:
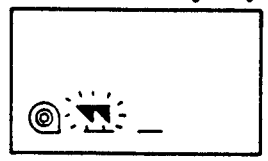
Figure 27J:
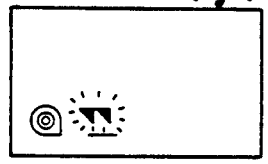
Figure 27K:
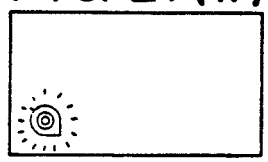

Then, if shutter releasing operation is effected, when a film is wound-up, the winding-up mark is displayed by the display element 623 as shown in FIG. 27d, and then upon completion of winding-up of the film by one frame, the winding-up mark display is erased and the display of the frame counter is incremented by one. If photographing of all the available frames of the loaded film is completed and accordingly the film is stretched in taut condition during winding-up of the film, the characters "FILM END" and the winding-up mark are displayed in a blinking manner by the character display elements 612, 613 and the display element 623, respectively, as shown in FIG. 27f to make a request for a film rewinding operation. Here, if the rewinding switch 811 is operated to turn the switch SWrew on, the display on the display device 600 changes as shown in FIG. 27g wherein the rewinding mark is displayed in a blinking manner by the display element 622 and the bar graph display including the four bar elements is provided by the display elements 624 to 627, whereby display of a remaining amount of a film for rewinding is started. Then as the film is rewound, each time about one fourth of the entire length of the film to be rewound is rewound, the four bar elements 624 to 627 are extinguished one by one as seen in FIGS. 27h to 27j, and when the rewinding is finally completed, the motor $M_2$ is automatically stopped and only the blinking display of the magazine mark element 621 remains as seen in FIG. 27k. In this manner, a rewinding condition is visually displayed on the display device 600.

Meanwhile, when the rear cover is closed without a film in the camera, initial loading operation is executed as accordingly such displays as seen in FIGS. 27a and 27b are provided successively on the display device 600. However, since the frame count then is zero as a result of checking of a state of the film detecting switch SWsls upon transmission of serial data (at step CS226 in the subroutine "SUB-C2" shown in FIG. 10 which is executed at step CS420 in the subroutine "SUB-C4" shown in FIG. 12) during such initial loading, if the initial loading is completed and the display of the ISO value is erased, the display on the display device 600 will return to that as shown in FIG. 27a, thereby giving a warning for loading of a film. Also when a leader portion of a film to be loaded is not caught well by the spool shaft and consequently initial loading is not completed properly, the same display will be made as in the case of absence of a film described above.

By the way, the example of the checking mode wherein all the display elements of the display devices 600, 700 in the form of liquid crystal display devices are lit at a same time is described hereinabove with reference to the flow charts of FIGS. 14 and 15. Here in the present embodiment, the mode in which all the display elements are lit simultaneously is entered by operation of the main switch 820 at a specific timing directly after the main power source battery 100 has been loaded into the camera. However, the timing at which the mode in which all the display elements are lit simultaneously is entered is not limited to the specific timing of the embodiment described above, and the mode may be otherwise entered by operation of a particular operating member at a different particular timing in a control sequence of the camera.

Figure 30:
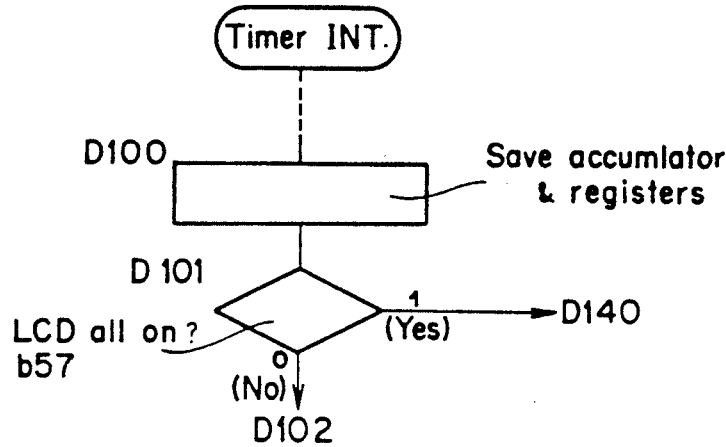
FIGS. 28 to 30 are flow charts illustrating modified operation of the camera of FIG. 1.
Figure 28:
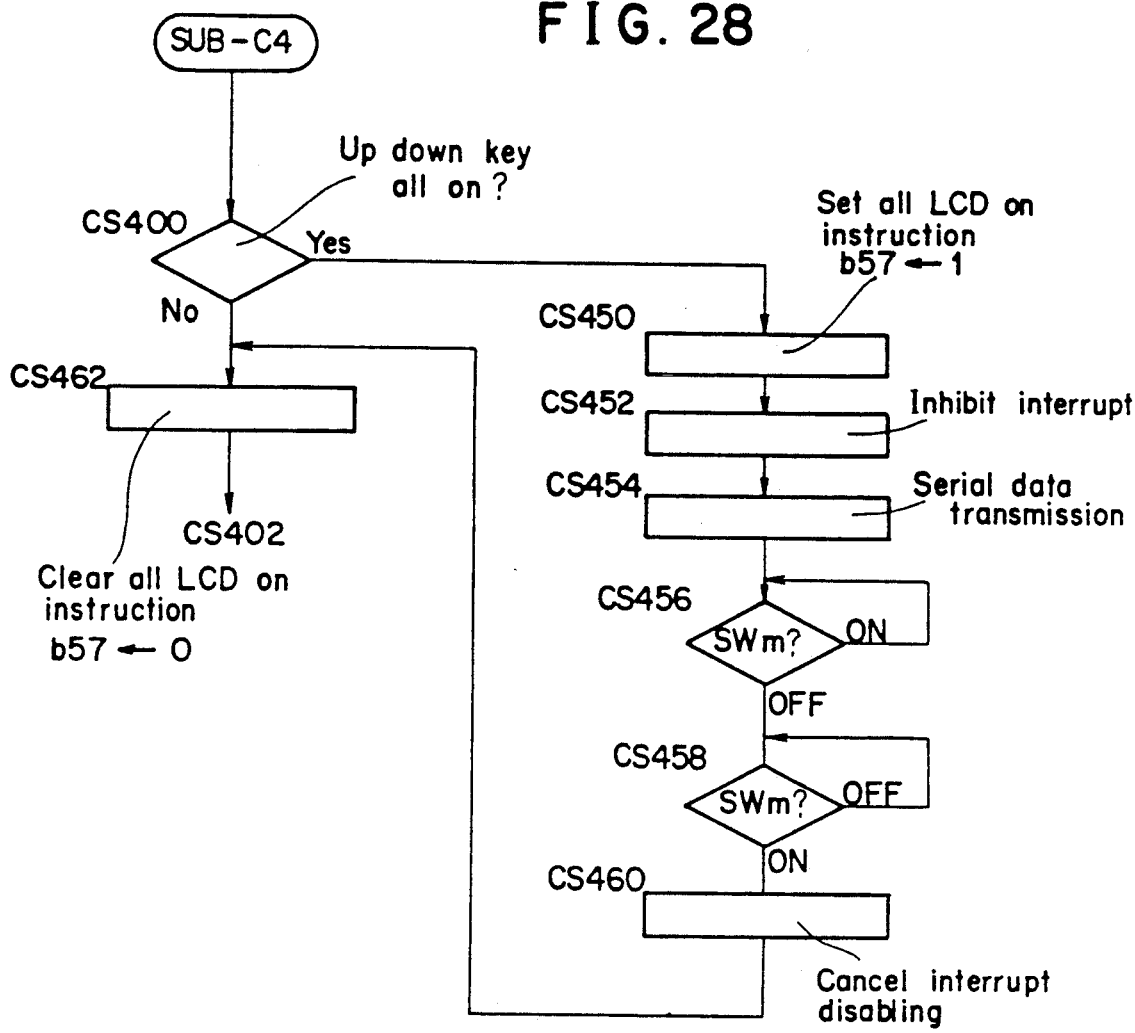
Figure 29:
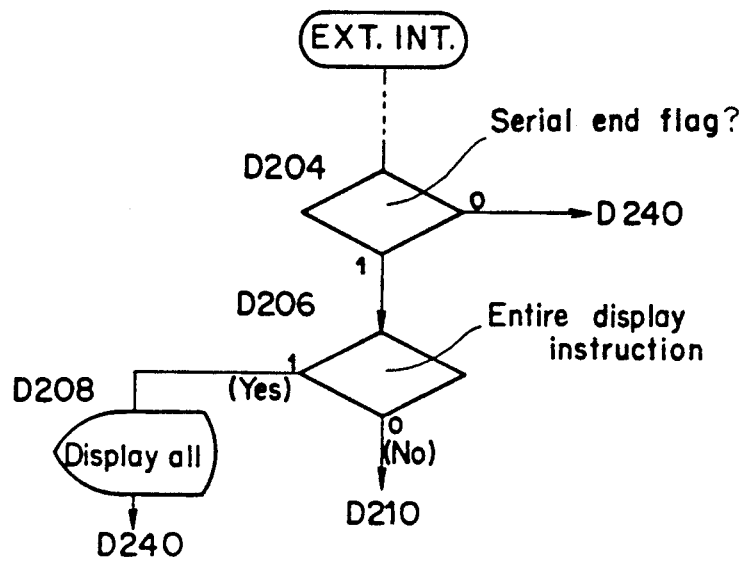

FIGS. 28 to 30 are flow charts illustrating modified operations of the camera where the mode in which all the display elements are lit simultaneously is entered at a different timing. In the modification, the mode in which all the display elements are lit simultaneously is entered if all the up and down keys A, B 805, 806, 807, 808 are depressed upon starting of initial loading directly after closing of the rear cover of the camera. Further, if the main switch 820 is operated during execution of the mode, the mode is canceled and the normal initial loading processing is subsequently executed. Here in the present modification, in order to allow the control CPU 200 and the display circuit 500 to operate in cooperation with each other, a bit b57 for an instruction to execute the mode in which all the display elements are lit simultaneously is provided in the serial data, and when the bit b57 is "1", the display circuit 500 instructs of a display by all the display elements, but on the contrary when the bit b57 is "0", normal operation for display is effected.

FIG. 28 shows a modification to the initial loading controlling subroutine "SUB-C4" shown in FIG. 12 for the control CPU 200. In the present subroutine, at first at step CS400 at the entrance, states of the switches SWua, SWda, SWub, SWdb associated respectively with all the up and down keys A, B 805, 806, 807, 808 are checked, and if at least one of the keys is not depressed and hence at least one of the switches is off, the program advances to step 462 at which the entire display instruction provided by the bit b57 of the serial data is cleared to "0", whereafter the program advances to step CS402 of FIG. 12. This corresponds to a case when the camera is used in a normal manner. To the contrary, in case all the up and down keys A, B 805 to 808 are depressed at step CS400, the program jumps to step CS450 in order to enter the mode in which all the display elements are lit at a same time. Thus, at first at step CS450, the entire display instruction of the bit b57 of the serial data is set to "1", and then at step CS452, all available interrupts are disabled. After then, the serial data are transmitted at step CS454 from the control CPU 200 to the display circuit 500. Upon reception of the serial data, the display circuit 500 controls to cause all the display elements to be lit as will be hereinafter described with reference to FIG. 29. Subsequently at step CS456, a state of the switch SWm associated with the main switch 820 is checked, and the display circuit 500 thus waits while circulating along a loop of the step CS456 until the switch SWm is turned off.

Finally when the switch SWm associated with the main switch 820 is turned off at step CS456, the program escapes from the loop to step CS458 at which it circulates similarly along a loop of the step CS458 until the switch SWm is turned on. Here, if the switch SWm is turned on, then the disabling of all available interrupts is canceled at step CS460, and then at step CS462, the entire display instruction of the bit b57 of the serial data is cleared to "0", whereafter the program returns to the normal processing beginning with the step CS402 shown in FIG. 12.

FIG. 29 is part of a flow chart illustrating processing operation of the display circuit 500 for the processing operation of the control CPU 200 described just above and is a modification to the external interrupt processing routine shown in FIG. 17. Referring to FIG. 29, at step D204 after the serial data have been received from the control CPU 200 at step D202 of FIG. 17 after occurrence of an external interrupt, the serial end flag is checked, and if the serial end flag is "1", then the entire display instruction of the bit b57 of the serial data is checked at step D206. Here, if the bit b57 is "0", the program advances to step D210 of FIG. 17 in order to achieved the processing for normal display as described hereinabove. On the contrary, if the bit b57 of the serial data is "1", the program branches to step D208 at which "1" is placed into all the addresses of the display RAM in order to illuminate all the display elements at a same time, whereafter the program jumps to step D240 of FIG. 17 and then returns to the original routine.

FIG. 30 is part of a flow chart showing a timer interrupt routine of the display circuit 500, and is a modification to the flow chart of FIG. 16. Referring to FIG. 30, at step D101 after the accumulator and working registers have been saved at step D100 after occurrence of a timer interrupt, the entire display instruction of the bit b57 of the serial data is checked, and if the bit b57 is "0" here, the program advances to step D102 of FIG. 16 in order to achieve the normal processing. On the contrary if the bit b57 is "1" at step D101, the program jumps to step D140 of FIG. 16 at which the accumulator and working registers are restored to their respective original values and then returns to the original routine. In other words, when the bit b57 is "1" at step D101 of FIG. 30, the program returns to the original routine without achieving any processing where the timer interrupt processing is executed because all the display elements are already in a lit state upon processing of receiving the serial data.

With the operations illustrated in the flow charts shown in FIGS. 28 to 30, the mode in which all the display elements are lit at a same time can be entered by closing of the rear cover while all the up and down keys A, B 805 to 808 are kept depressed. Further, even after the mode has been entered, if the switch SWm associated with the main switch 820 is once turned off and then turned on again, the mode can be canceled and the normal initial loading processing can be entered.

It is to be noted that while in the embodiment described above the switch SWsls for detecting a film is located on the film winding spool, it may otherwise be located on a path of a film adjacent a face of a rail which is normally provided for guiding a film. Further, while in the present embodiment a film rewinding operation is stopped immediately after the film detecting switch SWsls has been turned off, such a film rewinding operation may be stopped otherwise, for example, upon lapse of a time of one second or so after the switch SWsls has been turned off so as to reduce the length of a leader portion of a film to be left unrewound outside a film magazine.

What is claimed is:

1. A camera having a plurality of microcomputers, comprising:
    first microcomputer means, operating in synchronism with the first clock that generates first clock pulses at a first frequency, for controlling an operation of said camera,
    second microcomputer means, operating in synchronism with a second clock that generates second clock pulses at a second frequency which is lower than the first frequency, for controlling an operation of said camera, said first microcomputer means having a function relating to cooperation with said second microcomputer means,
    means for starting said first clock and said second clock at the same time, and
    delay means, responsive to said starting means, for causing said first microcomputer means to delay said function relating to cooperation with said second microcomputer means until said second microcomputer has stabilized.

2. A camera according to claim 1, further comprising:
    means for displaying information relating to camera operation, wherein said second microcomputer controls said displaying means.

3. A camera according to claim 1, wherein said delay means causes said first microcomputer means to delay said function relating to cooperating with control said second microcomputer means until a predetermined time elapses, said predetermined time being sufficient for said second microcomputer means to stabilize after said second clock is started by said starting means.

4. A camera according to claim 1, wherein said starting means is responsive to a loading of a battery into the camera.

5. A camera according to claim 4, further comprising:
    means responsive to said battery loading for resetting said first microcomputer means and said second microcomputer means to a predetermined state.

* * * * *